(12) United States Patent
Karri et al.

(10) Patent No.: US 12,511,354 B2
(45) Date of Patent: Dec. 30, 2025

(54) SYSTEM, METHOD, AND COMPUTER-ACCESSIBLE MEDIUM FOR REGISTER-TRANSFER LEVEL LOCKING AGAINST AN UNTRUSTED FOUNDRY

(71) Applicants: New York University, New York, NY (US); POLITECNICO di MILANO, Milan (IT)

(72) Inventors: Ramesh Karri, New York, NY (US); Siddharth Garg, New York, NY (US); Christian Pilato, Uboldo (IT)

(73) Assignees: New York University, New York, NY (US); POLITECNICO di MILANO, Milan (IT)

(*) Notice: Subject to any disclaimer, the term of this patent is extended or adjusted under 35 U.S.C. 154(b) by 0 days.

(21) Appl. No.: 17/525,267

(22) Filed: Nov. 12, 2021

(65) Prior Publication Data
US 2022/0147598 A1   May 12, 2022

Related U.S. Application Data

(60) Provisional application No. 63/113,057, filed on Nov. 12, 2020.

(51) Int. Cl.
*G06F 21/14*   (2013.01)
*G06F 21/10*   (2013.01)

(52) U.S. Cl.
CPC .......... *G06F 21/14* (2013.01); *G06F 21/1066* (2023.08)

(58) Field of Classification Search
CPC .................. G06F 21/14; G06F 2221/0748
USPC ..................................................... 726/26
See application file for complete search history.

(56) References Cited

U.S. PATENT DOCUMENTS

| | | | | |
|---|---|---|---|---|
| RE42,551 E | * | 7/2011 | Dalvi | G06F 12/1433 726/26 |
| 8,732,468 B2 | * | 5/2014 | Roy | G06F 21/70 726/32 |
| 9,824,172 B1 | * | 11/2017 | Hao | G06F 30/327 |
| 2002/0072893 A1 | * | 6/2002 | Wilson | G06F 13/1605 714/E11.207 |
| 2005/0183072 A1 | * | 8/2005 | Horning | G06F 21/14 717/140 |

(Continued)

FOREIGN PATENT DOCUMENTS

EP   3944106 A1 * 1/2022 .......... G06F 21/125

OTHER PUBLICATIONS

"Bhunia, Hardware Trojan Attacks: Threat Analysis and Countermeasures", Jul. 18, 2014, IEEE, pp. 1229-1247 (Year: 2014).*

(Continued)

*Primary Examiner* — Taghi T Arani
*Assistant Examiner* — Gregory A Lane
(74) *Attorney, Agent, or Firm* — HUNTON ANDREWS KURTH LLP

(57) ABSTRACT

Exemplary system, method, and computer-accessible medium for protecting at least one integrated circuit (IC) design, includes generating an abstract syntax tree ("AST") based on a hardware description language and a first register-transfer level (RTL) design. The method also includes selecting semantic elements in the AST to lock and locking the selected semantic elements. Additionally, the method includes a procedure for generating a second RTL design.

21 Claims, 20 Drawing Sheets

(56) References Cited

U.S. PATENT DOCUMENTS

| | | | | |
|---|---|---|---|---|
| 2008/0222581 | A1* | 9/2008 | Banerjee | G06Q 50/184 |
| | | | | 716/136 |
| 2010/0058271 | A1* | 3/2010 | Correale, Jr. | G06F 30/327 |
| | | | | 716/126 |
| 2012/0144353 | A1* | 6/2012 | Kamdar | G06F 30/3312 |
| | | | | 716/108 |
| 2014/0229517 | A1* | 8/2014 | Cain | G06F 21/14 |
| | | | | 708/490 |
| 2019/0286763 | A1* | 9/2019 | Kastner | G06F 30/3312 |
| 2019/0377580 | A1* | 12/2019 | Vorbach | G06F 9/30105 |
| 2021/0192018 | A1* | 6/2021 | Bhunia | G06F 21/76 |
| 2021/0406435 | A1* | 12/2021 | Jin | G06F 21/14 |
| 2022/0035977 | A1* | 2/2022 | Bhunia | G06F 30/392 |

OTHER PUBLICATIONS

Rostami, "A Primer on Hardware Security: Models, Methods, and Metrics", Aug. 2014, IEEE, pp. 1283-1292 (Year: 2014).*

S. W. Jones, "Technology and Cost Trends at Advanced Nodes," IC Knowledge LLC, 2019.

J. Hurtarte, E. Wolsheimer, and L. Tafoya, Understanding Fabless IC Technology. Elsevier, Aug. 2007.

S. Heck, S. Kaza, and D. Pinner, "Creating value in the semiconductor industry," McKinsey on Semiconductors, pp. 5-144, Oct. 2011.

J. Guin, et al "Counterfeit Integrated Circuits: A rising threat in the global semiconductor supply chain," Proceedings of the IEEE, vol. 102, No. 8, pp. 1207-1228, Aug. 2014.

W. Chen, et al, "Challenges and trends in modern SoC design verification," IEEE Design & Test, vol. 34, No. 5, pp. 7-22, Oct. 2017.

J. Rajendran, O. Sinanoglu, and R. Karri, "Is split manufacturing secure?" in Design, Automation & Test Conference in Europe, 2013, pp. 1259-1264.

A. T. Abdel-Hamid, S. Tahar, and E. M. Aboulhamid, "IP watermarking techniques: Survey and comparison," in IEEE International Workshop on System-on-Chip for Real-Time Applications, 2003, pp. 60-65.

K. Shamsi, et al., "IP protection and supply chain security through logic obfuscation: A systematic overview," ACM Transactions on Design Automation of Electronic Systems, vol. 24, No. 6, Sep. 2019.

B. Tan, et al., "Benchmarking at the frontier of hardware security: Lessons from logic locking," arXiv, 2020.

S. Amir, et al. Tehranipoor, and D. Forte, "Development and evaluation of hardware obfuscation benchmarks," Journal of Hardware and Systems Security, vol. 2, pp. 142-161, 2018.

Y. Shen, et al., "BeSAT: Behavioral SAT-based Attack on Cyclic Logic Encryption," in Asia and South Pacific Design Automation Conference, 2019, pp. 657-662.

Y. Xie and A. Srivastava, "Anti-SAT: Mitigating SAT attack on logic locking," IEEE Transactions on Computer-Aided Design of Integrated Circuits and Systems, vol. 38, No. 2, pp. 199-207, Feb. 2019.

M. Yasin, et al., "Provably-secure logic locking: From theory to practice," in Conference on Computer and Communications Security, 2017, pp. 1601-1618.

F. Yang, M. Tang, and O. Sinanoglu, "Stripped Functionality Logic Locking with Hamming Distance Based Restore Unit (SFLL-hd)—unlocked," IEEE Transactions on Information Forensics and Security, pp. 1-9, 2019.

D. Sirone and P. Subramanyan, "Functional analysis attacks on logic locking," in Design, Automation & Test Conference in Europe, Mar. 2019, pp. 1-6.

C. Pilato, F. Regazzoni, R. Karri, and S. Garg, "TAO: Techniques for algorithm-level obfuscation during high-level synthesis," in Design Automation Conference, Jun. 2018, pp. 1-6.

M. Yasin, C. Zhao, and J. J. Rajendran, "SFLL-HLS: Stripped-functionality logic locking meets high-level synthesis," in International Conference on Computer-Aided Design, 2019, pp. 1-4.

Y. Lao and K. K. Parhi, "Obfuscating dsp circuits via high-level transformations," IEEE Transactions on Very Large Scale Integration (VLSI) Systems, vol. 23, No. 5, pp. 819-830, 2015.

G. Di Crescenzo, A. Sengupta, O. Sinanoglu, and M. Yasin, "Logic locking of boolean circuits: Provable hardware-based obfuscation from a tamper-proof memory," in Innovative Security Solutions for Information Technology and Communications, E. Simion and R. Géraud-Stewart, Eds. Cham: Springer International Publishing, 2020, pp. 172-192.

C. Collberg, C. Thomborson, and D. Low, "A taxonomy of obfuscating transformations," Department of Computer Science, The University of Auckland, New Zealand, Tech. Rep. 148, 1997.

C. K. Behera and D. L. Bhaskari, 'Different obfuscation techniques for code protection, in International Conference on Eco-friendly Computing and Communication Systems, vol. 70, 2015, pp. 757-763.

H. Xu, Y. Zhou, Y. Kang, and M. R. Lyu, "On secure and usable program obfuscation: A survey," ArXiv, 2017.

K. Shamsi, D. Z. Pan, and Y. Jin, "On the impossibility of approximation-resilient circuit locking," in IEEE International Symposium on Hardware Oriented Security and Trust, 2019, pp. 161-170.

D. S. B. T. Force, "Report on high performance microchip supply," https://www.hsdl.org/ ?abstract&did=454591, 2005.

J. Rajendran, et al., "Belling the cad: Toward security-centric electronic system design," IEEE Transactions on Computer-Aided Design of Integrated Circuits and Systems, vol. 34, No. 11, pp. 1756-1769, Nov. 2015.

M. E. Massad, J. Zhang, S. Garg, and M. V. Tripunitara, "Logic locking for secure outsourced chip fabrication: A new attack and provably secure defense mechanism," arXiv, 2017.

Li and A. Orailoglu, "Piercing logic locking keys through redundancy identification," in Design, Automation & Test Conference in Europe, 2019, pp. 540-545.

P. Chakraborty, J. Cruz, and S. Bhunia, "SAIL: Machine learning guided structural analysis attack on hardware obfuscation," in Asian Hardware Oriented Security and Trust Symposium, 2018, pp. 56-61.

P. Chakraborty, et al., "SURF: Joint structural functional attack on logic locking," in International Symposium on Hardware Oriented Security and Trust, 2019, pp. 181-190.

MIT Lincoln Laboratory, "Common Evaluation Platform (CEP)," Available at: https://github.com/mit-II/CEP.

H. Badier, J. L. Lann, P. Coussy, and G. Gogniat, "Transient key-based obfuscation for hls in an untrusted cloud environment," in Design, Automation & Test Conference in Europe, 2019, pp. 1118-1123.

S. Takamaeda-Yamazaki, "Pyverilog: A Python-based hardware design processing toolkit for Verilog HDL," in International Symposium on Applied Reconfigurable Computing, Apr. 2015, pp. 451-460.

T. Ajayi, V et al, "Toward an open-source digital flow: First learnings from the openroad project," in Design Automation Conference, 2019.

Oliscience, "OpenCores repository," Available at: https://opencores.org/.

M. Puschel, F. Franchetti, and Y. Voronenko, Encyclopedia of Parallel Computing. Springer, 2011, ch. Spiral.

* cited by examiner

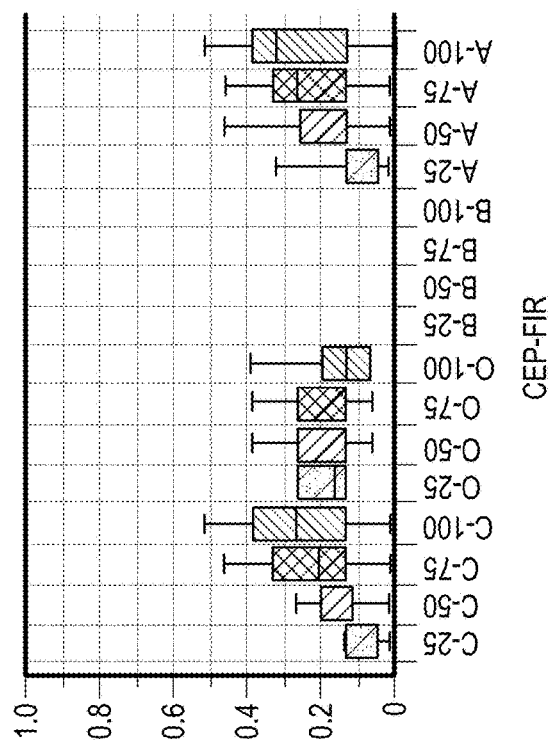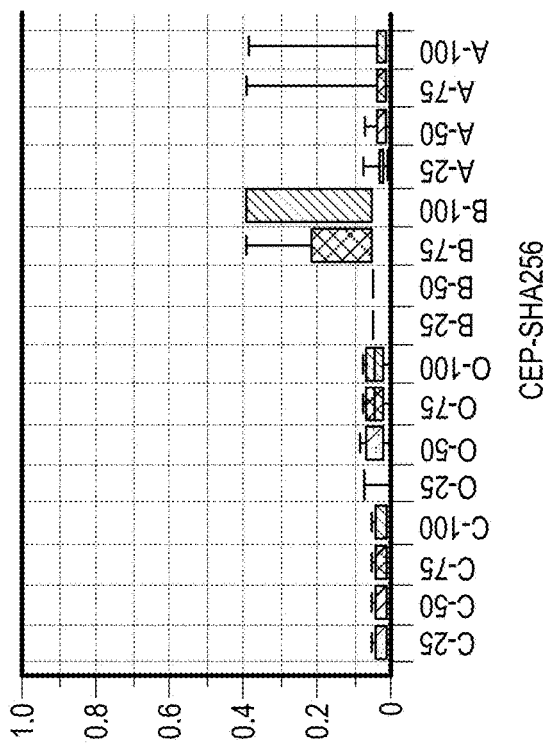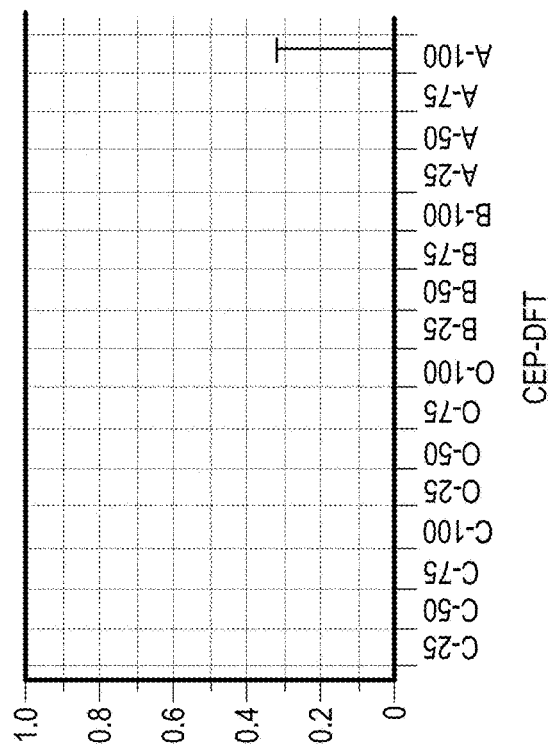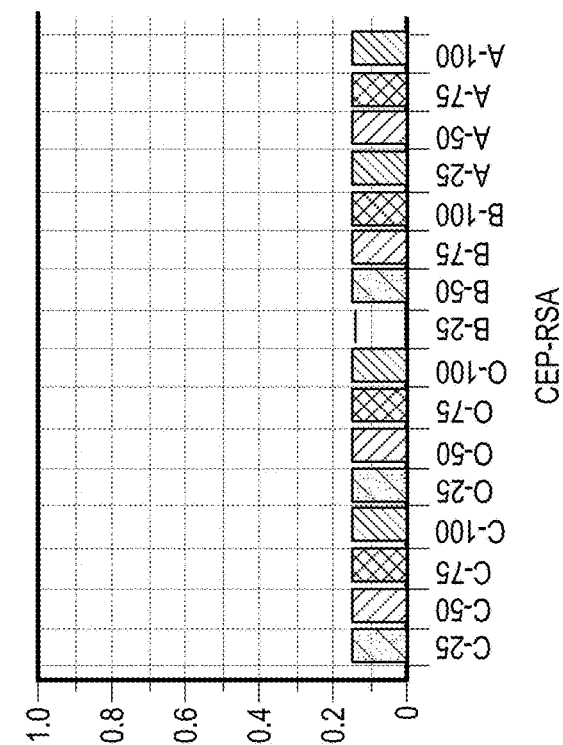
Figure 7(Cont...)

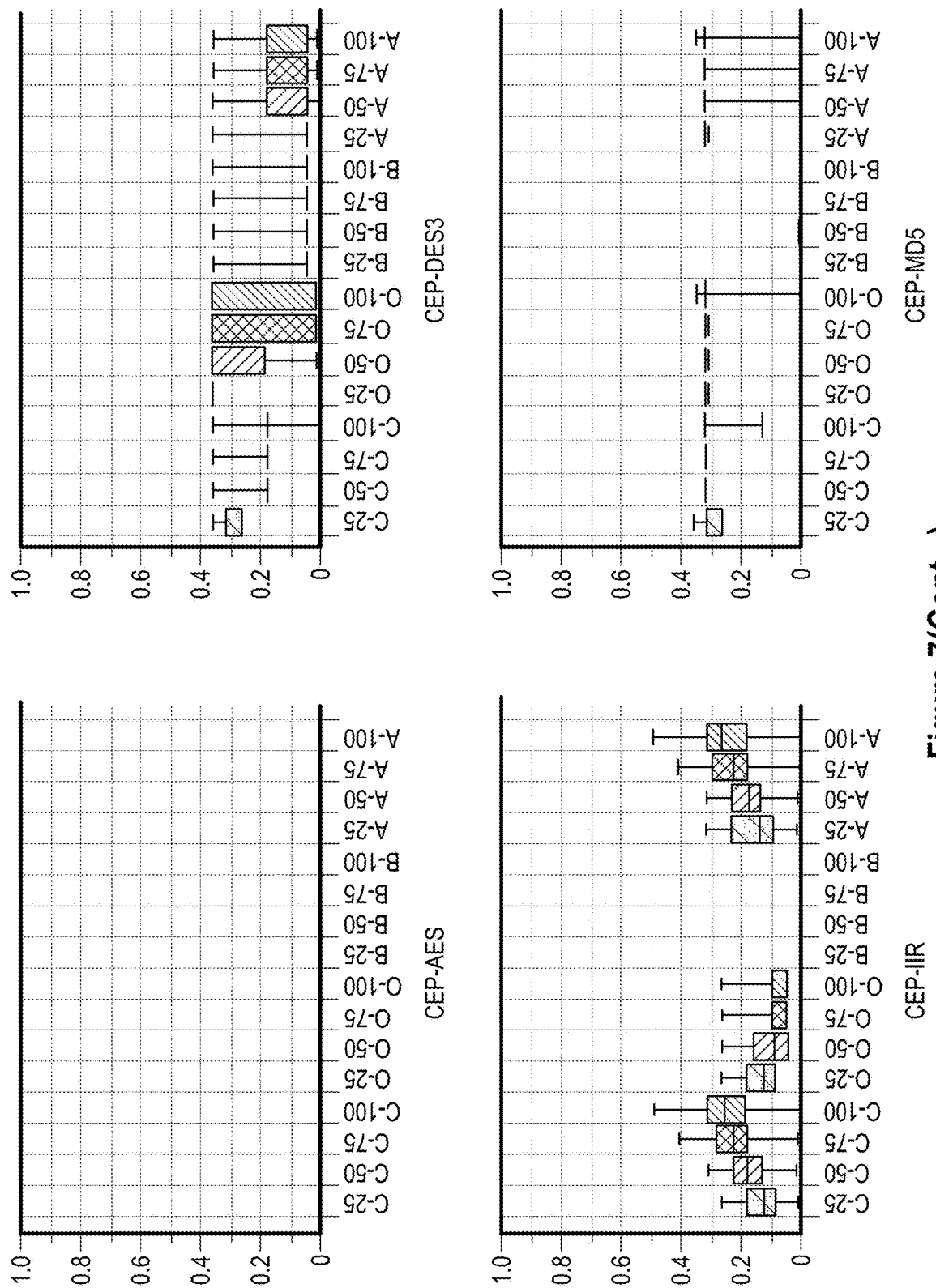
Figure 7(Cont...)

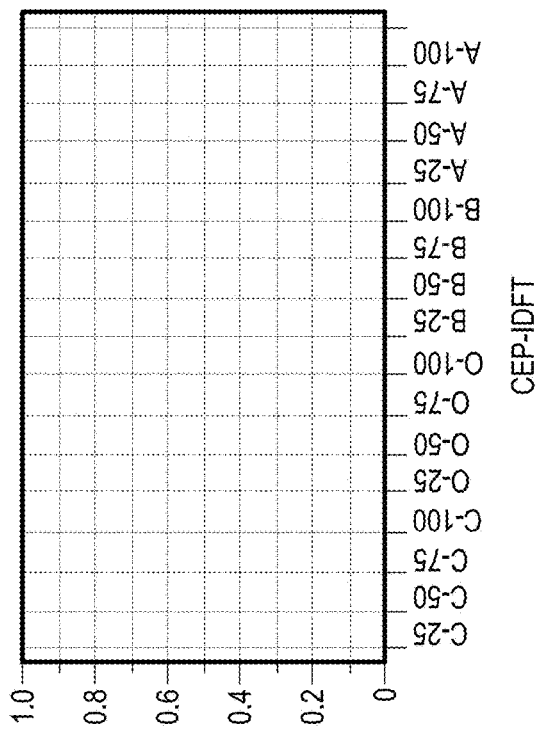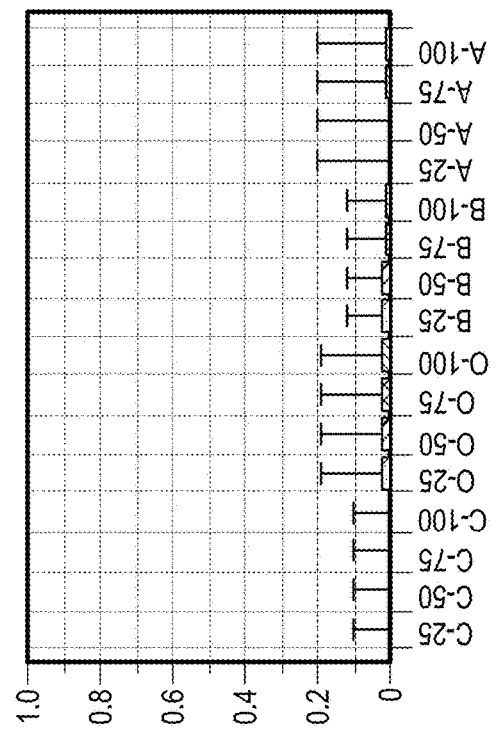
Figure 7(Cont...)

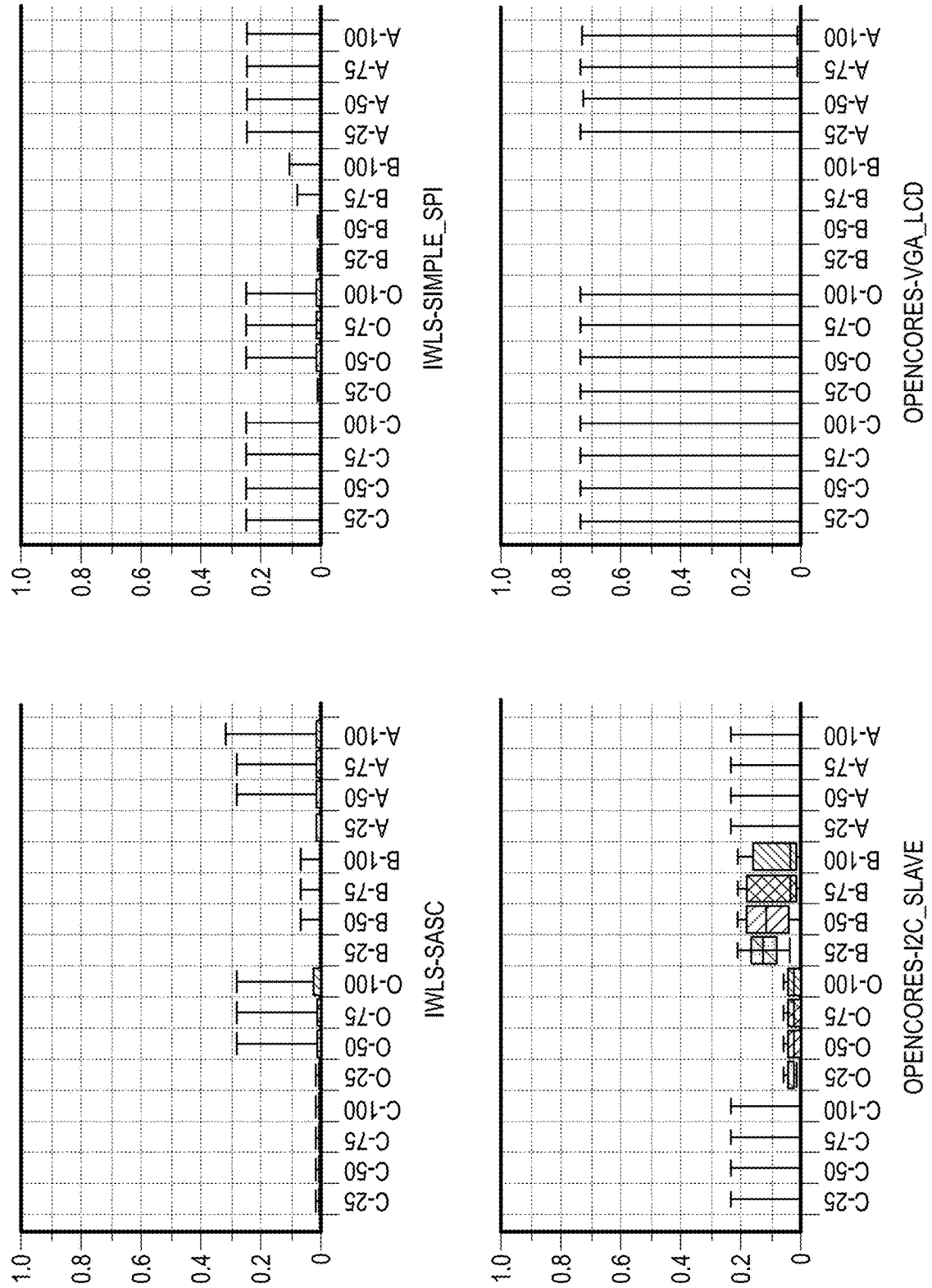
Figure 7(Cont...)

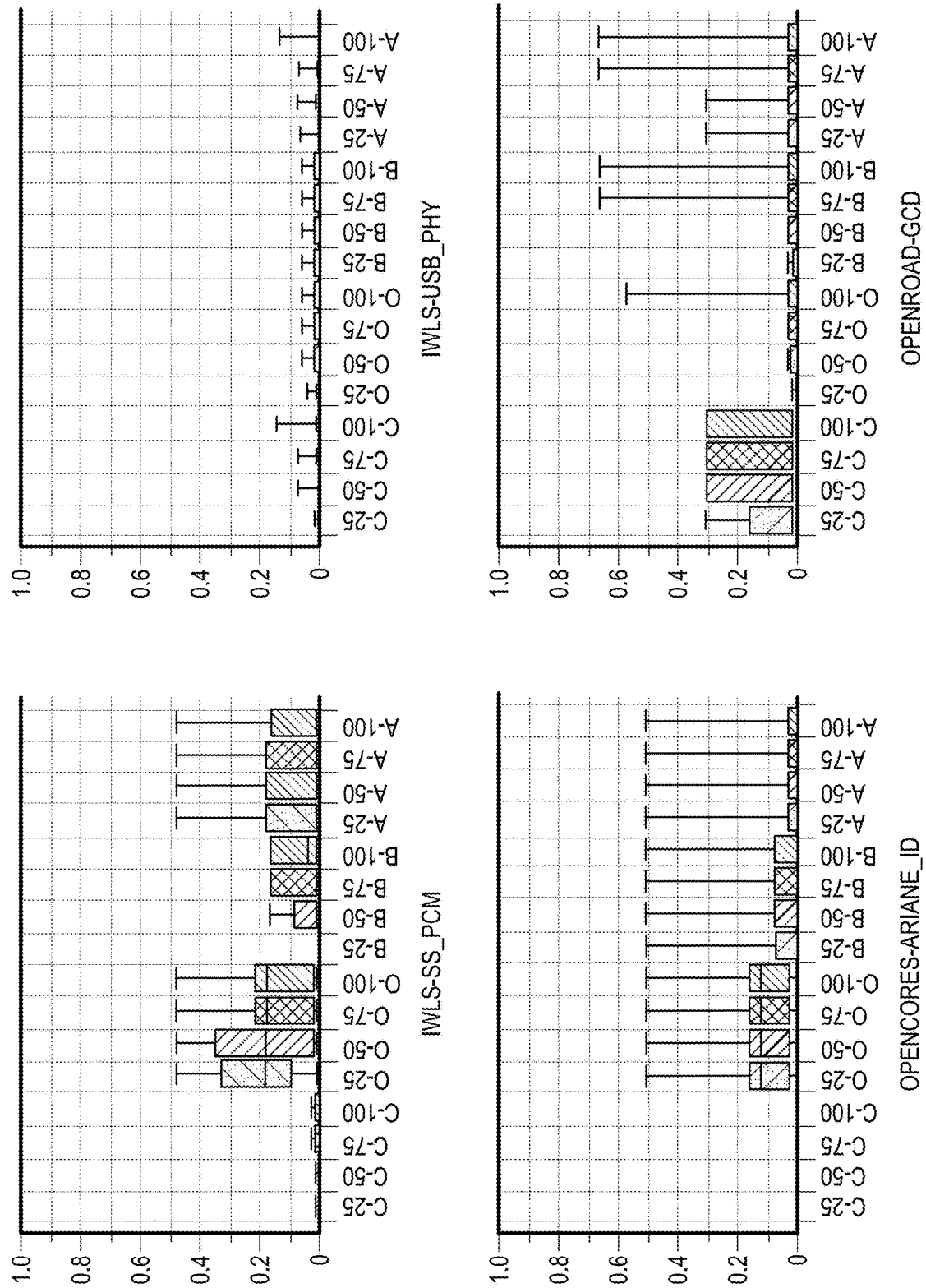
Figure 7(Cont...)

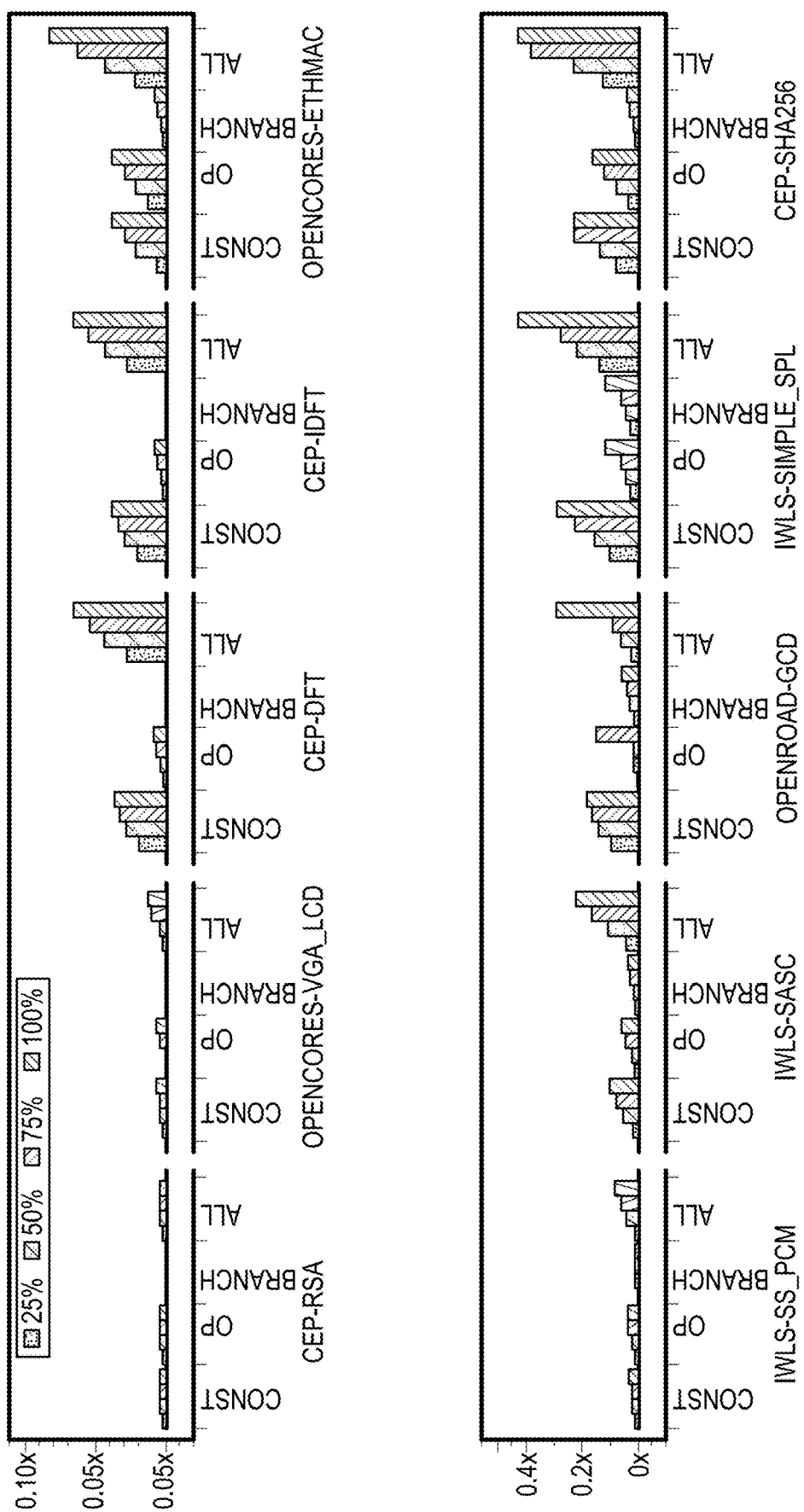
Figure 8 (Cont...)

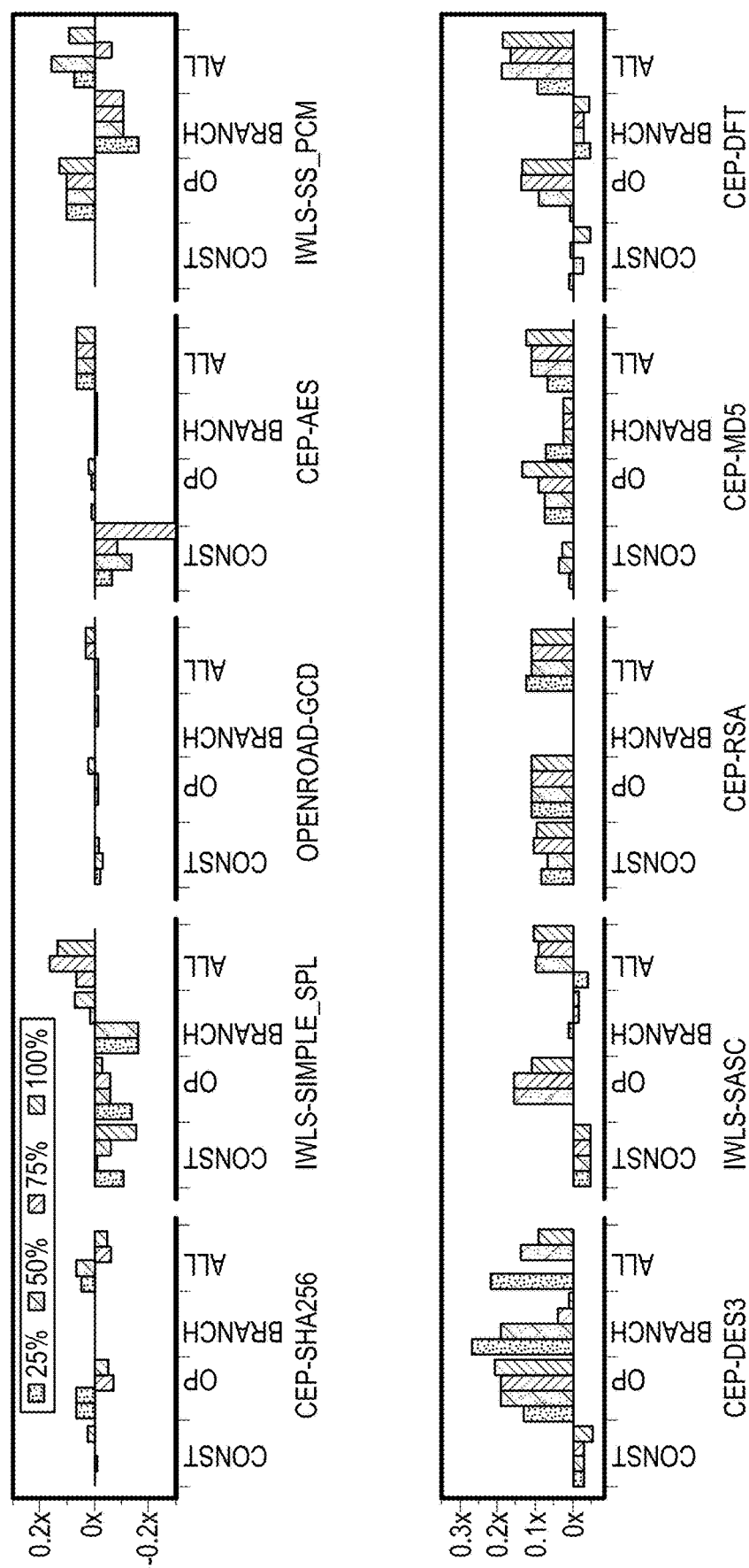
Figure 10 (Cont...)

SYSTEM, METHOD, AND COMPUTER-ACCESSIBLE MEDIUM FOR REGISTER-TRANSFER LEVEL LOCKING AGAINST AN UNTRUSTED FOUNDRY

CROSS-REFERENCE TO RELATED APPLICATION(S)

This application relates to and claims priority from U.S. Patent Application No. 63/113,057, filed on Nov. 12, 2020, the entire disclosure of which is incorporated herein by reference.

FIELD OF THE DISCLOSURE

The present disclosure relates generally to logic locking, and more specifically, to exemplary embodiments of an exemplary system, method, and computer-accessible medium for register-transfer level locking against an untrusted foundry.

BACKGROUND INFORMATION

The cost of IC manufacturing has increased by a factor of 5 when scaling from 90 nm to 7 nm. (See, e.g., Reference 1). An increasing number of design houses are now fabless and outsource the fabrication to a third-party foundry. (See, e.g., References 2 and 3). This can reduce the cost of operating expensive foundries but raises security issues. If a rogue actor in the third-party foundry receives access to the design files, the actor can reverse engineer the IC functionality to steal the Intellectual Property ("IP"), causing economic harm to the design house. (See, e.g., Reference 4).

FIG. 1 is a flow diagram for IC design and manufacturing by a third-party. This exemplary procedure can accept the specification in a hardware description language ("HDL") in exemplary procedure 110. The designers can create the components either manually or generate them automatically, and integrate them into a hardware description at the register-transfer level ("RTL") in exemplary procedure 120. Given a technology library (i.e., a description of gates in the target technology) and a set of constraints, logic synthesis can elaborate the RTL into a gate-level netlist in exemplary procedure 130 (e.g., by manual design, by using HLS tools or by using hardware generators). Logic synthesis can apply optimizations to reduce area and improve timing. While RTL descriptions are hard to match against high-level specifications (see, e.g., Reference 5), they can be used as a golden reference during synthesis to verify each procedure does not introduce any error. Physical design can generate the layout files (in exemplary procedure 140) that are sent to the foundry for fabrication of ICs (in exemplary procedure 150) that are then returned to the design house for packaging and testing.

Semiconductor companies are developing methods for IP obfuscation. In split manufacturing, for example, the design house can split the IC into parts that are fabricated by different foundries. (See, e.g., Reference 6). An attacker may have to access all parts to recover the IC. Watermarking can hide a signature inside the circuit, which can be later verified during litigation. (See, e.g., Reference 7). Finally, designers can apply logic locking (see, e.g., Reference 8) to prevent unauthorized copying and thwart reverse-engineering. These methods may introduce extra gates controlled by a key that can be kept secret from the foundry. These gates may activate the IC functionality by installing the key into a tamper-proof memory after fabrication.

Thus, it may be beneficial to provide an exemplary system, method, and computer-accessible medium for register-transfer level locking against an untrusted foundry which can overcome at least some of the deficiencies described herein above.

SUMMARY OF EXEMPLARY EMBODIMENTS

To that end, exemplary system, method, and computer-accessible medium can be provide for protecting at least one integrated circuit (IC) design. Exemplary system, method, computer-accessible medium and circuit, according to an exemplary embodiment of the present disclosure, can be provided for generating first data associated with the IC design based on a first register-transfer level (RTL) design; selecting semantic elements in the first data to lock the first RTL design; and locking the selected semantic elements so as to generate a second RTL design.

According to the exemplary system, method, computer-accessible medium and circuit, according to an exemplary embodiment of the present disclosure, a functionality of the first RTL design can at least substantially match a functionality of the second RTL design when a predetermined key can be applied to the second RTL design. In exemplary system, method, computer-accessible medium and circuit, according to an exemplary embodiment of the present disclosure, generating the first data can be based on an abstract syntax tree ("AST") procedure. For example, the semantic elements can be constants, operations and/or branches. The exemplary selection of the semantic elements can include uniquifying a module hierarchy and generating a list of modules.

The exemplary system, method, computer-accessible medium and circuit, according to further exemplary embodiments of the present disclosure can be used to select the semantic elements based on a black list of modules to be excluded from the locking procedure. In exemplary system, method, computer-accessible medium and circuit, according to an exemplary embodiment of the present disclosure, the black list can include update processes and loop induction variables. As an alternative or in addition, the selection of the semantic elements can be based on a number of bits required to lock the semantic elements.

In exemplary system, method, computer-accessible medium and circuit, according to an exemplary embodiment of the present disclosure, the locking of the selected semantic elements can include generating an opaque predicate. For example, the opaque predicate can be a predicate having a known outcome.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
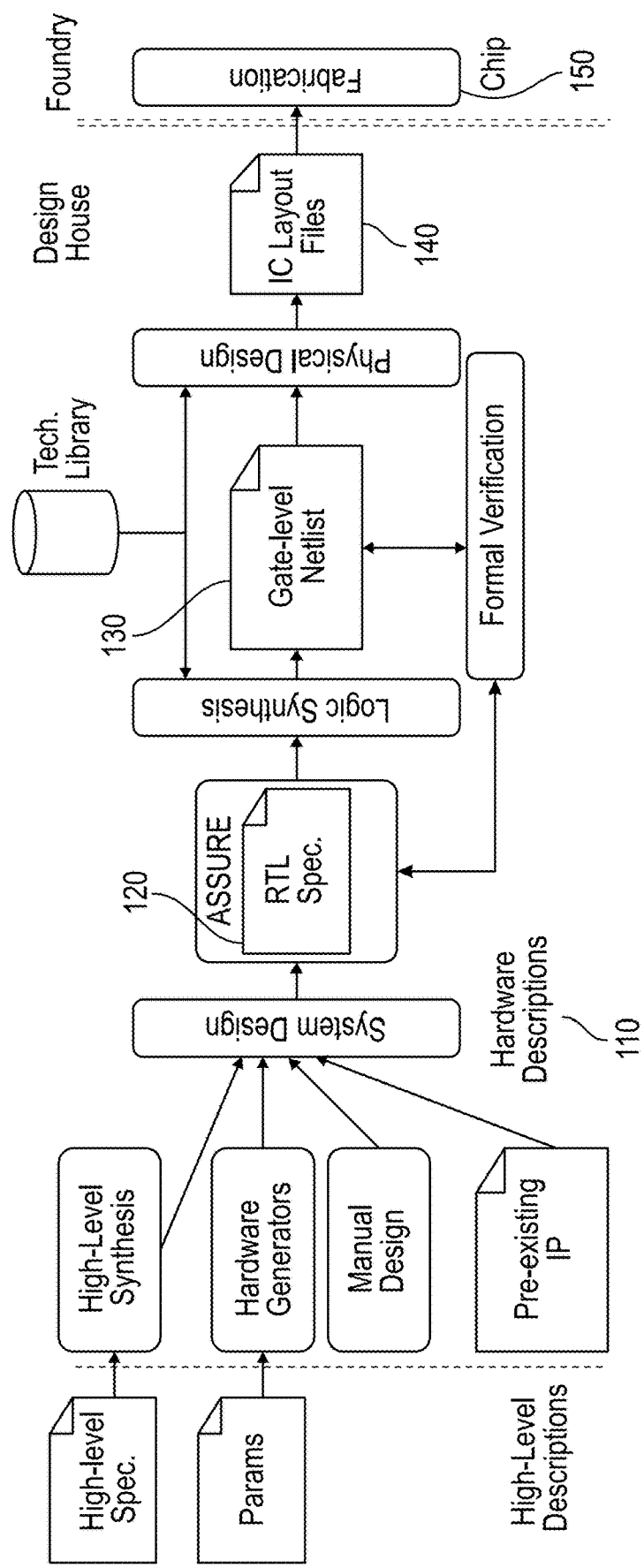
FIG. 1 is an exemplary diagram of an integrated circuit design flow.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures or provided in the claims.

DETAILED DESCRIPTION OF EXEMPLARY EMBODIMENTS

Some approaches lock gate-level netlists after logic optimizations have been applied. (See, e.g., Reference 9). Gate-level locking may not obfuscate all the semantic information because logic synthesis and optimizations absorb many of them into the netlist before the locking procedure. For example, constant propagation may absorb the constants into the netlist. When the attackers have access to an activated IC (i.e. the oracle), they may use Boolean Satisfiability ("SAT")-based attacks to recover the key. (See, e.g., References 10 and 11). Several solutions have been proposed to thwart SAT-based attacks. (See, e.g., References 12 and 13). Attacks on SFLL have been reported when the "protected" functional inputs can be at a certain (e.g., Hamming) distance from the key. (See, e.g., References 14 and 15).

Recently, alternative high-level locking methods have been proposed. (See, e.g., References 16-19). These methods obfuscate the semantic information before logic optimizations embed them into the netlist. TAO can apply obfuscations during HLS. (See, e.g., Reference 16). Some have considered HLS-based SFLL obfuscation. (See, e.g., Reference 17). Both approaches may require access to the HLS source code to integrate the obfuscations and may not be used to obfuscate existing IPs.

In exemplary system, method, computer-accessible medium, and circuit, according to an exemplary embodiment of the present disclosure, protecting a design at the register-transfer level ("RTL") can be a compromise that ASSURE may take. Some of the semantic information (e.g., constants, operations and control flows) can still be present in the RTL and obfuscations can be applied to existing RTL IPs. In exemplary system, method, computer-accessible medium, and circuit, according to an exemplary embodiment of the present disclosure, to obfuscate the semantic information, ASSURE can implement software program obfuscation. (See, e.g., References 20-22). An exemplary software program can obfuscate data structures, control flows and constants through code transformations or by loading information from memory at runtime.

In exemplary system, method, computer-accessible medium, and circuit, according to an exemplary embodiment of the present disclosure, the exemplary ASSURE RTL obfuscation can implement, e.g., one or more of three (3) procedures: obfuscating constants, arithmetic operations, and control branches. It should be understood that other procedures can be implemented. These can be provably secure and compatible with exemplary industrial design flows. The exemplary system, method, and computer-accessible medium, according to an exemplary embodiment of the present disclosure, can facilitate (i) an RTL-to-RTL translation for IP obfuscation, (ii) three obfuscations (e.g., constant, operations, and branch) with proofs of security, and/or (iii) reports on security and related overhead.

Exemplary Threat Model: Untrusted Foundry

The state-of-art in logic locking considers, e.g., two broad categories of threat models: netlist-only and oracle-guided. (See, e.g., References 8 and 23). In both settings, the attacker may have access to a locked netlist, but in the latter, also may have access to an unlocked IC (e.g., oracle). The exemplary oracle-guided model according to exemplary embodiments of the present disclosure can be relevant in high-volume commercial fabrication where it can be reasonable to assume that the attacker can purchase an unlocked IC in the market. The exemplary netlist-only model according to exemplary embodiments of the present disclosure, on the other hand, can capture low-volume settings, for instance, in the design of future defense systems with unique hardware requirements (see, e.g., Reference 24), where the attacker would not reasonably be able to access a working copy of the IC. For this reason, it can also be called oracle-less model. An exemplary oracle-less model according to exemplary embodiments of the present disclosure can be considered herein.

In the exemplary case of a fabless defense contractor that outsources an IC to an untrusted foundry for fabrication, the untrusted foundry may have access to the layout files of the design and can reverse engineer a netlist and even extract the corresponding RTL. (See, e.g., Reference 25). However, since the foundry produces the first ever batch of an IC design (e.g., in some cases the only one), an activated chip may not be available through any other means. Attacks that rely on knowledge of an IC's true I/O behavior, for instance the SAT attack, can therefore be out-of-scope. However, the attacker can still rely on a range of netlist-only attacks, desynthesis (see, e.g., Reference 26), redundancy identification (see, e.g., Reference 27) and ML-guided structural and functional analysis (see, e.g., References 28 and 29), for instance, to reverse engineer the locked netlist. In exemplary system, method, computer-accessible medium, and circuit, according to an exemplary embodiment of the present disclosure, ASSURE can obfuscate these exemplary three attacks, and ASSURE's locked netlists may not reveal any information about the design other than any prior knowledge that the designer might have about the design.

Exemplary ASSURE System and Configuration

Figure 2:
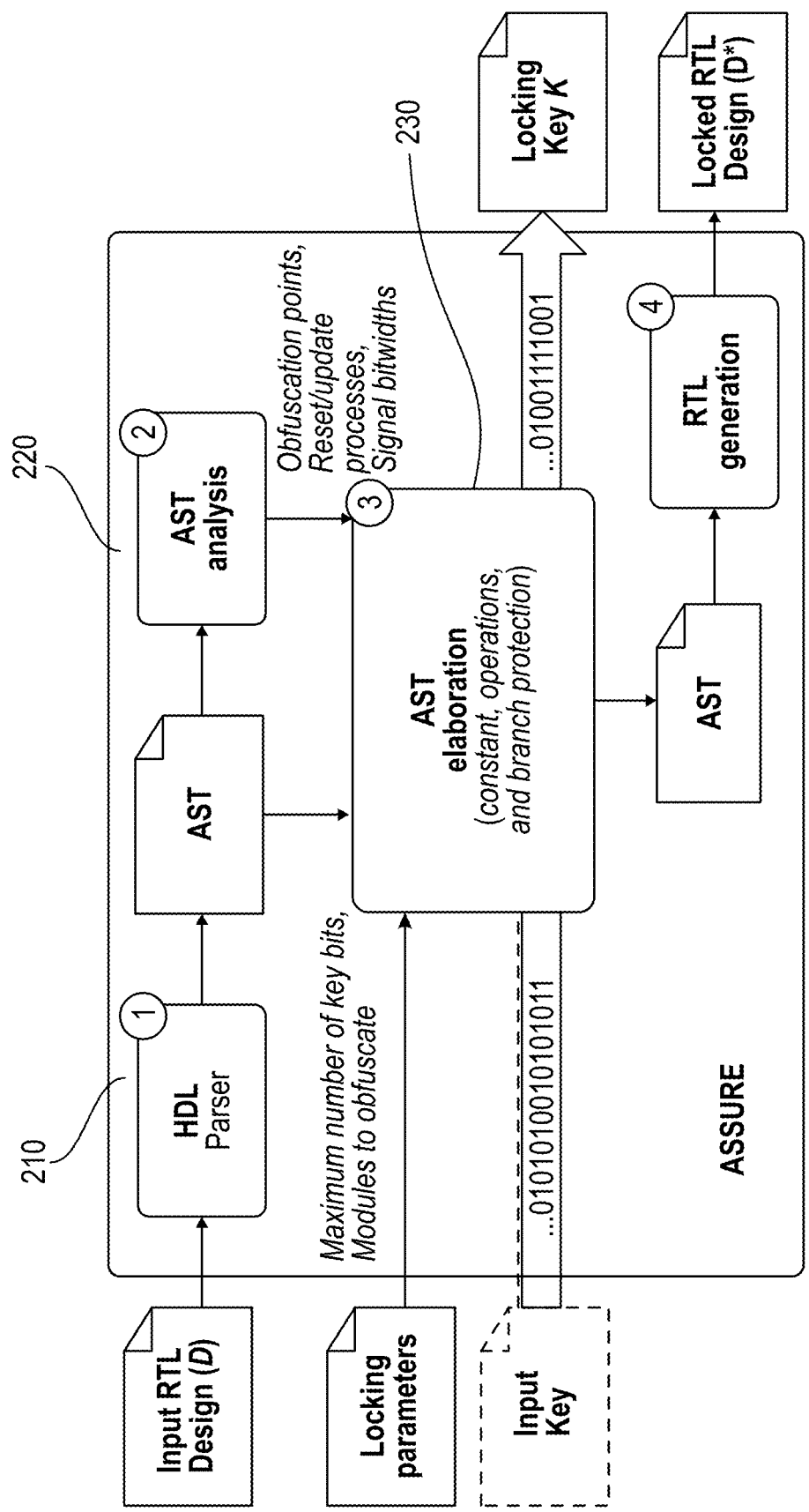
FIG. 2 is an exemplary diagram of an organization of an exemplary ASSURE system according to an exemplary embodiment of the present disclosure.

FIG. 2 shows the ASSURE flow diagram according to an exemplary embodiment of the present disclosure. In exemplary system, method, computer-accessible medium, and circuit, according to an exemplary embodiment of the present disclosure, given an RTL design D and a set of obfuscation parameters, ASSURE can generate an exemplary design D* and a key IC; such that D* matches the functionality of D only when IC; can be applied. ASSURE can be, e.g., a technology-independent and operates on the RTL after system integration but before logic synthesis. ASSURE can, e.g., obfuscate existing IPs and those generated with commercial HLS tools. ASSURE can obfuscate the semantic information in an RTL design using approaches used in program obfuscation to protect the software IP. (See, e.g., References 20 and 22). ASSURE can, e.g., obfuscate the RTL by adding in opaque predicates such that the evaluation of the opaque predicates depends on the locking key; their values can be known to the designer during obfuscation, but unknown to the untrusted foundry. ASSURE can, e.g., obfuscate three semantic elements useful to replicate function of an IP:

1) constants can contain sensitive information in the computation (e.g., filter coefficients);
2) operations can determine functionality; and
3) branches can define the execution flow (i.e., which operations can be executed under conditions).

In exemplary system, method, computer-accessible medium, and circuit, according to an exemplary embodiment of the present disclosure, ASSURE can parse the input HDL and create the abstract syntax tree ("AST")—in exemplary procedure 210. It can then analyze the AST to select the semantic elements to lock (e.g., in exemplary procedure 220) and obfuscate them (e.g., AST elaboration—in exemplary procedure 230). The RTL generation phase (e.g., in exemplary procedure 240) can produce the output RTL design that can have the same external interface as the original module, except for an additional input port that can be connected to the place where $K_r^*$ can be stored. In exemplary system, method, computer-accessible medium, and circuit, according to an exemplary embodiment of the present disclosure, ASSURE can start from a synthesizable IP, and can modify its description, which can fit with existing EDA flows and same constraints as the original, including tools to verify that resulting RTL can be equivalent to the original design when the correct key can be used and to verify that it may not be equivalent to the original when an incorrect key can be used.

In exemplary system, method, computer-accessible medium, and circuit, according to an exemplary embodiment of the present disclosure, the functionality of D* can be much harder to understand without the parameter $K_r^*$. If the attackers apply a key different from $K_r^*$ to D*, they obtain plausible but wrong circuits, indistinguishable from the correct one. These variants can be indistinguishable from one another without a-priori knowledge of the design.

Exemplary ASSURE Obfuscation Flow

To generate an obfuscated RTL design, the requirements of the IP design can be matched with the constraints of the technology for storing the key (e.g., maximum size of the tamper-proof memory). On one hand, the number of bits needed to obfuscate the semantics of an RTL design may depend on the complexity of the procedure to protect. On the other hand, the maximum number of key bits that can be used by ASSURE (e.g., $K_{max}$) can be a design constraint that depends on the technology for storing them in the circuit. ASSURE can analyze the input design to identify which modules and which circuit elements in modules should be protected. In exemplary system, method, computer-accessible medium, and circuit, according to an exemplary embodiment of the present disclosure, ASSURE can perform a depth-first analysis of the design to uniquify the module hierarchy and creates a list of modules to process. In this example embodiment, ASSURE can hide the semantics of the different modules so that extracting knowledge from one instance does not necessarily leak information on all modules of the same type.

---

Exemplary Procedure 1: ASSURE obfuscation.

Procedure ObfuscateModule ($AST_m$, $K_r^*$, $K_{max}$)
| Data: $AST_m$ is the AST of the module m to obfuscate
| Data: $K_r^*$ is the current locking key
| Data: $K_{max}$ is the maximum number of key bits to use
| Result: $AST_m^*$ is the obfuscated AST of the module m
| Result: $K_r^*$ is the updated locking key
| BlackList ← CreateBlackList ($AST_m$);
| $AST_m^*$ ← BlackList;
| ObfElem ← DepthFirstAST ($AST_m$) \ BlackList;
| foreach el ∈ ObfElem do
|   |   $b_{el}$ ← BitReq(el);
|   |   if KeyLength ($K_r^*$)+$b_{el}$ > $K_{max}$ then
|   |   |
|   |   |   $AST_m^*$ ← $AST_m^*$ ∪ el;
|   |   else
|   |
|   |   |   $K_{el}$ ← GetObfuscationKey (el);
|   |   |   $AST_m^*$ ← $AST_m^*$ ∪ Obfuscate(el, $K_{el}$);
|   |   |   $K_r^*$ ← $K_r^*$ ∪ $K_{el}$;

return {$AST_m^*$, $K_r^*$ }

---

In exemplary system, method, computer-accessible medium, and circuit, according to an exemplary embodiment of the present disclosure, after uniquifying the design, ASSURE can analyze the AST of each module with Procedure 1 starting from, e.g., the innermost ones. Given an exemplary hardware module, ASSURE can create a "black list" of the elements that can be excluded from obfuscation (e.g., line 2). For example, the black list contains elements inside reset and update processes or loop induction variables. The designer can also, e.g., annotate the code to specify that specific regions or modules can be excluded from obfuscation (e.g., I/O processes or publicly-available IPs). The black-list elements can be added unchanged to the output AST (e.g., line 3). Finally, ASSURE can determine the list of AST elements to obfuscate (e.g., line 4) and process them (e.g., lines 5-12). For each element, e.g., it can compute the number of bits required for obfuscation (e.g., line 6) and check if there can be enough remaining key bits (e.g., line 7). If not, in one example, ASSURE may not obfuscate the element (e.g., line 8).

In exemplary system, method, computer-accessible medium, and circuit, according to an exemplary embodiment of the present disclosure, reusing a key bit across multiple elements as in (see, e.g., Reference 16) can reduce the security strength of the exemplary procedure because extracting the key value for one element invalidates the obfuscation of all others sharing the same key bit. If the obfuscation is possible (e.g., lines 9-12), ASSURE can generate the corresponding key bits (e.g., line 10). These bits can depend on the specific obfuscation technique to be applied to the element and can be randomly generated, extracted from an input key (see e.g., FIG. 2), or extracted from the element itself. In exemplary system, method, computer-accessible medium, and circuit, according to an exemplary embodiment of the present disclosure, ASSURE can utilize these key bits to obfuscate the element and the result can be added to the output AST (e.g., line 11). The key bits can also be added to the output locking key (e.g., line 12). This procedure can be repeated for all modules until the top, which can return the AST of the entire design and the final key.

Exemplary ASSURE Obfuscations and Security Proofs

In exemplary system, method, computer-accessible medium, and circuit, according to an exemplary embodiment of the present disclosure, each of the ASSURE procedures can target an essential element to protect and uses a distinct part of the r-bit locking key $K^*_r$, to create an opaque predicate. In software, an opaque predicate can be a predicate for which the outcome can be known by the programmer, but requires an evaluation at run time. (See, e.g., Reference 20). Hardware opaque predicates were created, for which the outcome can be determined by ASSURE (and so known) at design time, but requires to provide the correct key at run time. Any predicate involving the extra parameter meets this exemplary requirement. Given a locking key $K^*_r$, ASSURE generates a circuit indistinguishable from the ones generated with any other $K_r \neq K^*_r$, when the attacker has no prior information on the design.

Exemplary ASSURE procedures can provide provable security guarantees. (See, e.g., Reference 26). For example, an m-input n-output Boolean function $\mathcal{F}:X \to Y$, where $X \in \{0, 1\}^m$ and $Y \in \{0, 1\}^n$. Obfuscation L receives $\mathcal{F}$) and an r-bit key $K^*_r$ and generates a locked design $C_{lock}$.

Exemplary Definition(s)

In exemplary system, method, computer-accessible medium, and circuit, according to an exemplary embodiment of the present disclosure, an obfuscation procedure L can be defined as, for example:

$$\mathcal{L}(\mathcal{F}(X), K^*_r) = C_{lock}(X, K) \quad (1)$$

where the mapping $C_{lock}: X \times K \to Y$, and $K \in \{0, 1\}^r$ such that, for example:

$$C_{lock}(X, K^*_r) = \mathcal{F}_{K^*_r}(X) = \mathcal{F}(X)$$

$$C_{lock}(X, K_r) = \mathcal{F}_{K_r}(X) \neq \mathcal{F}(X) \text{ when } K_r \neq K^*_r$$

This exemplary definition can show that $C_{lock}$ can generate a family of Boolean functions $\{\mathcal{F}_{K_r}\}$ based on the r-bit key value $K_r$. The functionality $\mathcal{F}(X)$ can only be unlocked uniquely with the correct key $K^*_r$. This can be followed by a corollary about an exemplary characteristic of the family of Boolean functions that can be generated by $C_{lock}(X, K)$.

For an obfuscated netlist $C_{lock}(X, K)$ created using $K^*_r$ and $\mathcal{F}(X)$, the unlocked functionalities $\mathcal{F}_{K_1}$ and $\mathcal{F}_{K_2}$ (corresponding to keys $K_1$ and $K_2$) relate, for example, as follows:

$$\mathcal{F}_{K_1} \neq \mathcal{F}_{K_2} \forall K_1, K_2 \in K, K_1 \neq K_2 \quad (2)$$

Exemplary Proof. The first case (i) $K_1 = K^*_r$ can be considered. Therefore, by the definition of RTL obfuscation procedure $\mathcal{L}$, $\mathcal{F}_{K_1} \neq \mathcal{F}_{K_2} \forall K_2 \in K, K_1 \neq K_2$. Now, for case (ii) $K_1 \neq K^*_r$, there exists a locked netlist $C'_{lock}$, which locked $\mathcal{F}_{K_1}$ using $K_1$. Therefore, $\mathcal{F}_{K_2} = C'_{lock}(X, K_2)$. By the definition of logic locking security, $\mathcal{F}_{K_2} \neq \mathcal{F}_{K_1} \forall K_2 \neq K_1$ in $C'_{lock}(X, Y)$.

$P[C_{lock}(X, K)|L_s(\mathcal{F}(X), K^*_r)]$ can be defined as the probability of obtaining the locked design $C_{lock}(X, K)$ given that the Boolean function $\mathcal{F}(X)$ was locked by applying L with $K^*_r$. An exemplary logic locking procedure L can be secure under the oracle-less threat model as follows:

A logic locking procedure L for r-bit key K can be secure for a family of Boolean functions $\mathcal{F}_{K_r}$ of cardinality $2^r$ if the following condition holds true:

$$P[C_{lock}(X,K)|L(\mathcal{F}(X),K^*_r)]=P[C_{lock}(X,K)|L(\mathcal{F}_{K_r}(X),K_r)] \forall K_r \neq K^*_r, \mathcal{F}(X) \neq \mathcal{F}_{K_r}(X) \quad (3)$$

The above states that the locked netlist generated by applying logic locking procedure L can be equally likely to be created by a family of Boolean function $\mathcal{F}_{K_r}(X)$ along with the original Boolean function $\mathcal{F}(X)$. It can be shown that above two claims can be satisfied for all the exemplary obfuscation procedures and provide a security guarantee of $2^r$ under the proposed threat model.

Figure 3A:
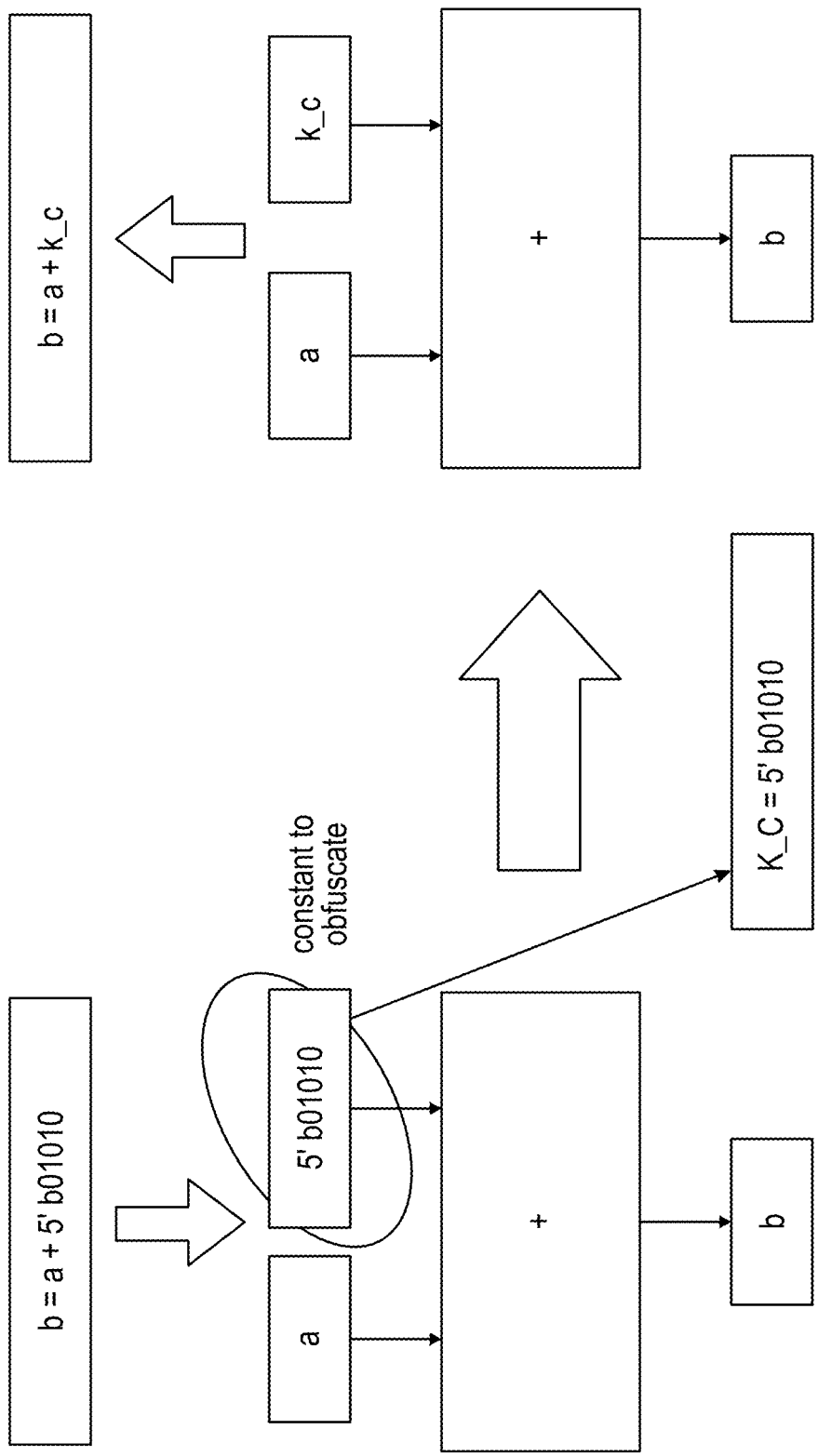
FIG. 3A is an exemplary diagram illustrating constant ASSURE obfuscations according to an exemplary embodiment of the present disclosure.

Constant Obfuscation: This exemplary obfuscation can remove selected constants and moves them into the locking key K, as shown in FIG. 3A. The original function can be preserved only when the key provides the correct constant values. Each constant bit can be a hardware-opaque predicate; the designer knows its value and the circuit operation depends on it. Example: Consider the RTL operation b=a+5'b01010. To obfuscate the constant, a 5 bit key K_c=5'b01010 can be added. The RTL can be rewritten as b=a+K_c. The attacker has no extra information and $2^5$ possibilities from which to guess the correct value.

Hiding constant values facilitates designers to protect proprietary information but also can prevent subsequent logic optimizations (e.g., constant propagation and wire trimming). However, several constants may not be useful and, in some exemplary cases, problematic to protect. For example, reset values can be set at the beginning of the computation to a value that can usually be zero and then assigned with procedure-related values. Additionally, obfuscating reset polarity or clock sensitivity edges of the processes introduces two problems: incorrect register inferencing, which can lead to synthesis issues of the obfuscated designs, and incorrect reset process that easily leads to identify the correct key value. In particular, obfuscation can be applied to the reset processes and the attacker provides an incorrect key value, the IC can be stalling in the reset state when it can be in normal execution. Thus, constants related to reset processes and sensitivity values for obfuscation can be excluded.

Exemplary Proof. The structure of the obfuscated circuit can be independent of the constant and, given an r-bit constant, the $2^r$ values can be indistinguishable. The attacker cannot get insights on the constants from the circuit structure. ASSURE constant obfuscation can satisfy the provable security criteria of logic locking L under strong adversarial model as defined above.

An exemplary RTL design of m inputs and n outputs $R:X \to Y$, $X \in \{0,1\}^m$ and uses an r-bit constant $C_{orig}$ can be considered. ASSURE constant obfuscation can convert the r-bit constant into an r-bit key $K^*_r$ as a lock L and uses it to lock the design $C_{lock}$ (X, K). The obfuscated RTL can be depicted as, for example:

$$C_{output} = K \quad (4)$$

where, $C_{output} = C_{orig}$, when $K = K^*_r = C_{orig}$.

Any unlocked constant $C_{K_1}$ and $C_{K_2}$ using r-bit keys $K_1$ and $K_2$ can be unique.

Exemplary Proof. $\forall K_1 \neq K_2, K_1, K_2 \in \{0,1\}^r \Rightarrow C_{K_1} \neq C_{K_2}$ A constant-obfuscated exemplary circuit with r-bit key K can be generated from $2^r$ possible constants (each of r-bit) with equal probability, i.e. the following holds true.

$$P[C_{output}|K=K^*_r] = P[C_{output}|K=K_r]$$

$$\forall K_r \neq K^*_r; K_r \in 2_r \quad (5)$$

Exemplary Proof. The probability of choosing $K_r$ can be uniform. So, $$P[K=K^*_r] = P[K=K_r], \forall K_r \neq K^*_r$$

$$\Rightarrow P[C_{orig}] = P[C_r], C_{orig} \neq C_r \forall C_r \in \{0,1\}^r.$$

The above jointly denote that the constant obfuscated by $2^r$ unique constants can be indistinguishable and can be unlocked uniquely by the correct r-bit key. Constant obfuscation hides the original constants with a security strength of $2^r$.

Figure 4:
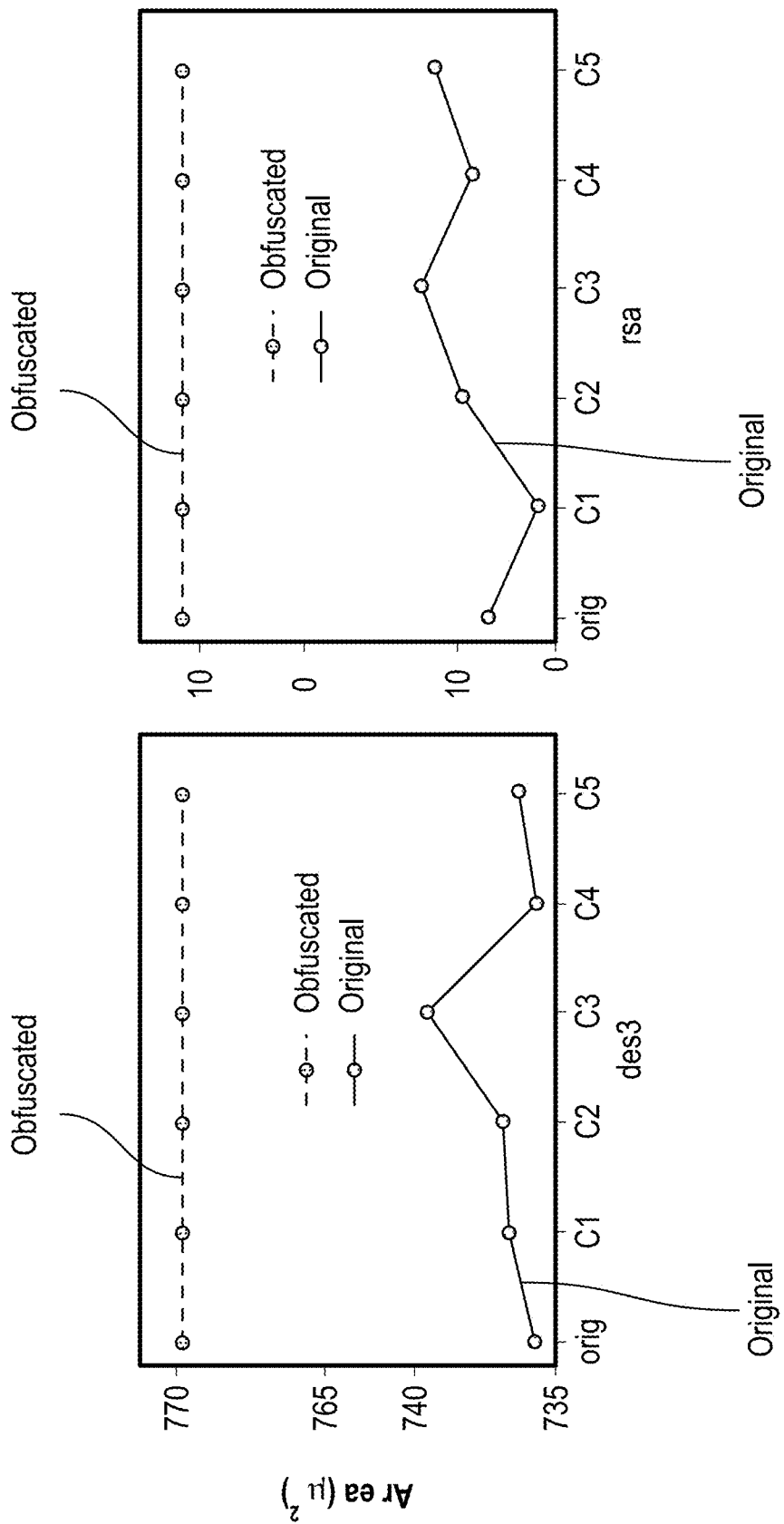
FIG. 4 is a set of graphs illustrating area overhead for original and obfuscated variants using different sontants in the statement according to an exemplary embodiment of the present disclosure.

FIG. 4 shows exemplary area overhead of DES3 and RSA for two CEP benchmarks accordingly to exemplary embodiments. (See, e.g., Reference 30). This experiment shows that constant obfuscation generates indistinguishable circuits. A variable from each benchmark can be considered: sel_round from DES3 and modulus_ml_len from RSA. Different circuits can be generated by assigning different constants to the same variable. These circuit variants can be synthesized, and the area overhead can be obtained. For example, FIG. 4 illustrates that every constant value (e.g., c1-c5) can be reverse engineered from the synthesized circuit since each constant directly maps to unique area overhead. On the contrary, the area overhead of synthesized circuits remain the same after obfuscation, and the obfuscated circuits can be indistinguishable, making it difficult for the attacker to recover the constant.

Figure 3B:
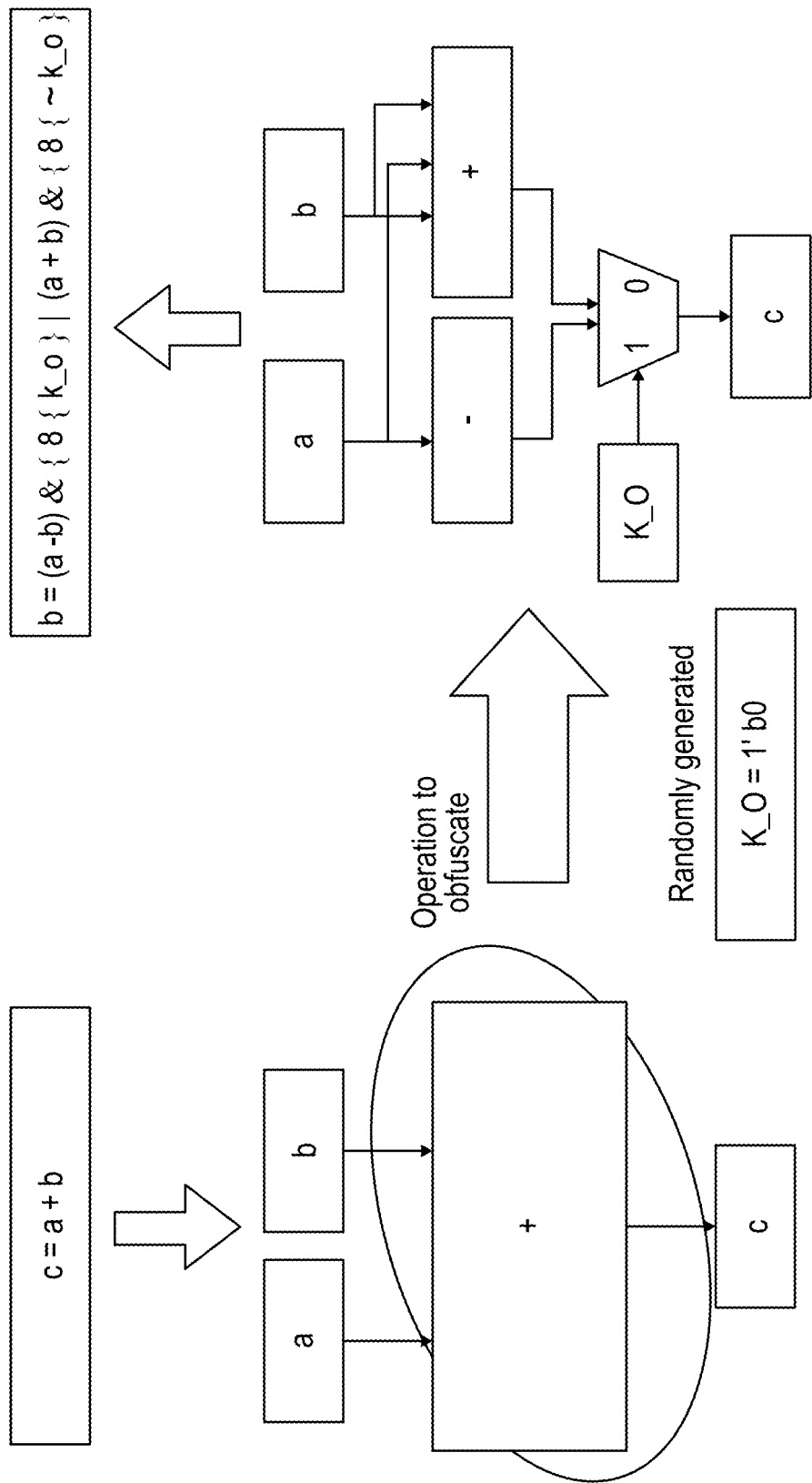
FIG. 3B is an exemplary diagram illustrating branch ASSURE obfuscations according to an exemplary embodiment of the present disclosure.

Exemplary Operation Obfuscation: A random key bit can be generated, which can be used to multiplex the operation result with that from another operation sharing the same inputs, as shown in FIG. 3B. The mux selector can be a hardware opaque predicate because the designer knows its value and the mux propagates the correct result only for the correct key bit. This can be similar to that proposed for C- and HLS obfuscation. (See, e.g., References 16 and 31).

Example: L RTL operation c=a+b can be obfuscated with a dummy subtraction. A key bit k_0=1'b0 can be generated, and the RTL can be rewritten as c=k_o?a−b:a+b. The original function can be selected for the correct k_o.

The ternary operator can be a simple representation of the multiplexer, but it can impact code coverage. It can introduce extra branches in the circuit, where one of the paths may never be activated once the key can be provided. To keep the same coverage as the original design, the mux selection can be rewritten as o=in1 & k|in2 & ~k.

Exemplary Operation: c=a+b obfuscated as c=k_o? a−b: a+b can be written as c=(a−b)&{8{k_o}}|(a+b)&{8{~k_o}}. This can be equivalent to ternary operation without branches, and same code coverage.

Since operations use the same inputs, ASSURE, in example embodiments of the present disclosure, can add a multiplexer at the output with its select connected to the key bits. The multiplexer and the additional operator can be area overhead. The multiplexer impacts the critical path and the additional operation introduces a delay when it takes more time than the original one. A pool of alternatives was created for each operation type. Original and dummy operations can be "balanced" in complexity to avoid increasing the area and the critical path. Dummy operations can be selected to avoid structures the attacker can easily unlock. Incrementing a signal by one cannot be obfuscated by a multiplication by one, clearly a fake. Dummy operators can also be selected to avoid collisions. For example, adding a constant to a signal cannot be obfuscated with a subtract because the wrong operation key bit can activate the circuit when the attacker provides the two's complement of the constant.

Exemplary Proof. Consider an RTL design with m inputs and n outputs, with a mapping: $\mathcal{F}:X \to Y$, $X \in \{0,1\}^m$ and with r possible sites for operator obfuscation. ASSURE obfuscation can use multiplexer ("MUX") based locking L and uses an r-bit key $K^*_r$ to lock the design $C_{lock}(X, K)$.

$$C_{lock}(X, K) = \mathcal{F}(X, k_1, k_2, \ldots, k_r) \quad (6)$$

$$= \overline{k_1}\mathcal{F}(X, 0, k_2, \ldots, k_r) + k_1 \mathcal{F}(X, 1, k_2, \ldots, k_r)$$

$$= \underbrace{K^1_r \mathcal{F}(X, K = K^1_r)}_{\mathcal{F}_{K_1}} + \underbrace{K^2_r \mathcal{F}(X, K = K^2_r)}_{\mathcal{F}_{K_2}} + \ldots$$

$$\ldots + \underbrace{K^{2^r}_r \mathcal{F}(X, K = K^{2^r}_r)}_{\mathcal{F}_{K_{2^r}}}$$

where, $\mathcal{F}_{K^*_r}(X) = C_{lock}(X, K=K^*_r)$, $K^*_r$ can be r-bit key. Each location of operator obfuscation applies output of different operations (one original and another fake) to a multiplexer. The following equation holds true for operator obfuscation.

$$\mathcal{F}_{(X,k_1,\ldots,k_i=0,\ldots,k_r)} \neq \mathcal{F}_{(X,k_1,\ldots,k_i=1,\ldots,k_r)} \forall i \in [1,r] \quad (7)$$

Secondly, the sites of operation obfuscation can be different. The output of multiplexer using any key-bit value at one location can be independent of the choice made elsewhere. Given a key K, the unlocked function of two circuits can be different if the same logic value can be set at two different key-bit locations. For an example K=1101, if one chooses bit location 2 and 4 and flip them, i.e. $K_1=1001$, $K_2=1100$, then $\mathcal{F}_{K_1} \neq \mathcal{F}_{K_2}$.

$$\mathcal{F}_{(X,k_1,\ldots,\overline{k_i},\ldots,k_r)} \neq \mathcal{F}_{(X,k_1,\ldots,k_j=\overline{k_j},\ldots,k_r)}$$

$$\forall i, j \in [1,r], i \neq j \quad (8)$$

Any pair of unlocked circuit $F_{K^1_r}$ and $F_{K^2_r}$ using r-bit keys $K^1_r$ and $K^2_r$ on MUX based obfuscated circuit $C_{lock}(X, K)$ can be unique.

Exemplary Proof. $\forall K^1_r \neq K^2_r, K^1_r, K^2_r \in \{0,1\}^r$ $\Rightarrow$ Hamming distance $(K_1, K_2) \in [1, r]$.

$\Rightarrow$ Eq. 7+Eq. 8, $F_{K_1} \neq F_{K_2}$

UX-based obfuscation with r-bit key K can be generated from r different locations having $2^r$ operations with equal probability, i.e. following condition holds true.

$$P[C_{lock}|(F_{K^*_r},K^*_r)]=P[C_{lock}|(F_{K^i_r},K^i_r)]$$

$$\forall K^i_r \neq K^*_r; F_{K^i_r} \neq F_{K^*_r}; i \in [1,2^r]$$

Exemplary Proof. The probability of choosing $K_r$ can be uniform. Therefore, for example:

$$P[K = K^*_r] = P[K = K^i_r], \forall K^i_r \neq K^*_r$$

$$\Rightarrow P[C_{lock}(X, K = K^*_r)] = P[C_{lock}(X, K = K^i_r)]$$

$$\Rightarrow P[F_{K^*_r}] = P[F_{K^i_r}] = \frac{1}{2^r}.$$

The above show that operator obfuscation can generate indistinguishable netlists.

Figure 5:
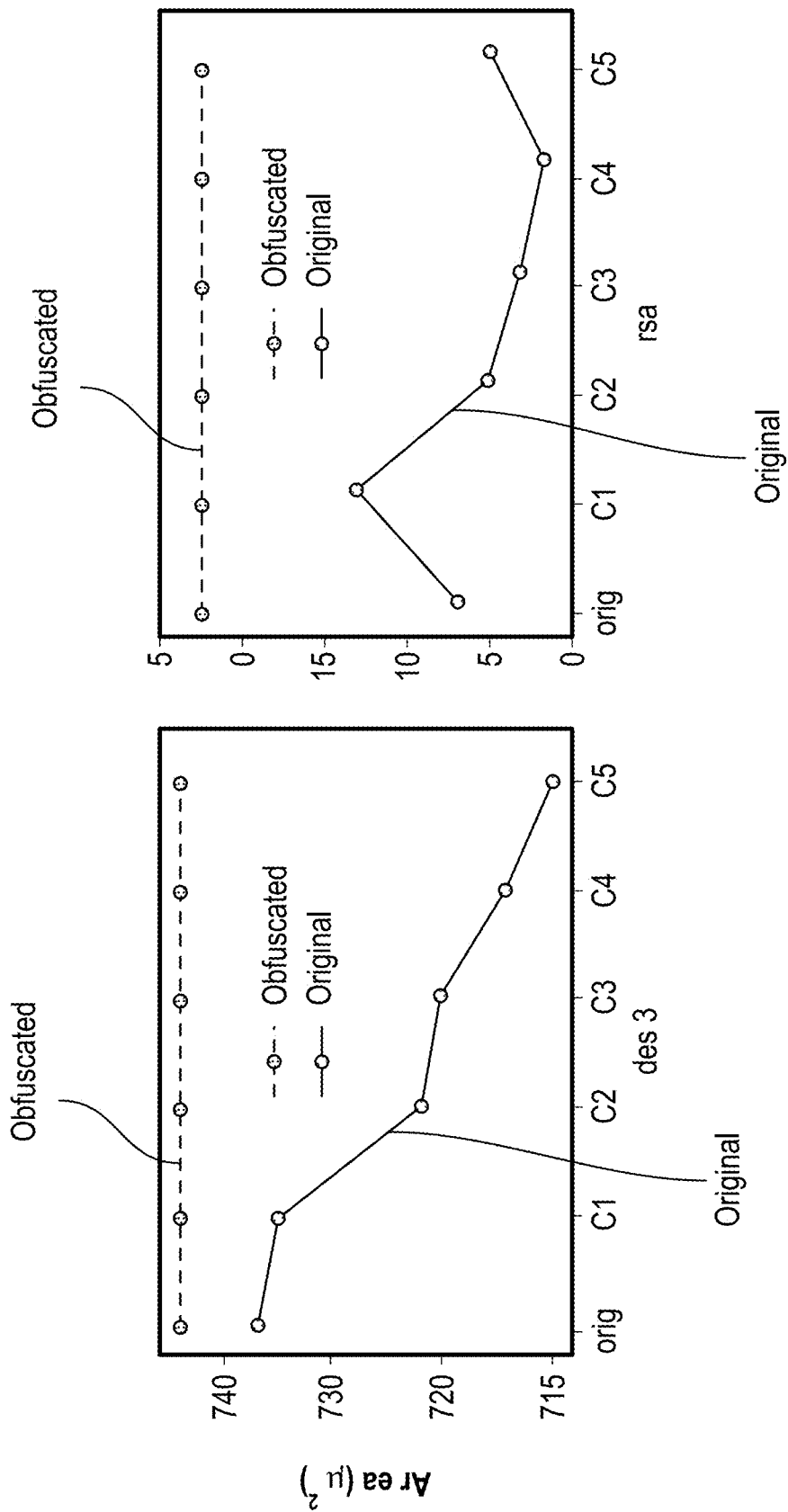
FIG. 5 is a set of graphs illustrating area overhead for original and obfuscated variants using different operators in the statement according to an exemplary embodiment of the present disclosure.

FIG. 5 shows an exemplary area overhead of the two benchmark circuits DES3 and RSA for operator obfuscation which indicated the generation of indistinguishable circuits. A single operation from each benchmark can be considered: addition of auxiliary input and round_output from DES3, and subtraction of modulus_ml_len from a constant value in RSA. Different circuits can be generated by replacing the original operators with other operators. After synthesis, area overhead of these variants (see, e.g., FIG. 5) can be unique and can be reverse engineered. On the contrary, the area overhead of synthesized circuits can remain the same after obfuscation and so the obfuscated circuits reveals nothing about the original operator.

Figure 3C:
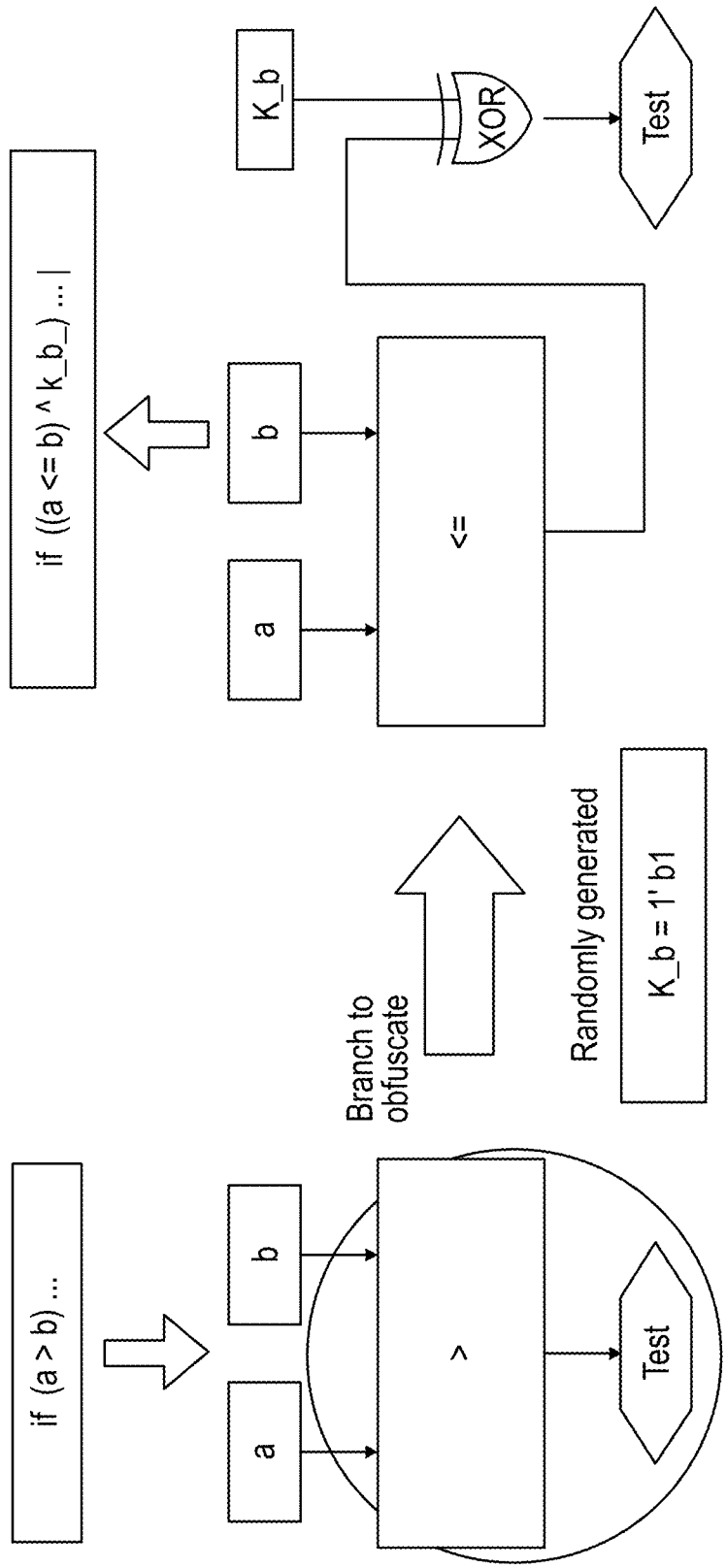
FIG. 3C is an exemplary diagram illustrating operation ASSURE obfuscations according to an exemplary embodiment of the present disclosure.

3) Exemplary Branch Obfuscation: To hide which branch can be taken after the evaluation of an RTL condition, the test can be obfuscated with a key bit as cond_res⊕k_b, as shown in FIG. 3C. To maintain semantic equivalence, the condition can be negated to reproduce the correct control flow when k_b=1'b1 because the XOR gate inverts the value of cond_res. De Morgan's law can be applied to propagate the negation to disguise the identification of the correct condition. The resulting predicate can be hardware-opaque because the designer knows which branch can be taken but this can be unknown without the correct key bit.

Example: Let a>b be the RTL condition to obfuscate with key k_b=1'b1. The condition can be rewritten as (e.g., a<=b) ^k_b, which can be equivalent to the original one only for the correct key bit. The attacker has no additional information to infer if the original condition can be > or <=.

Obfuscating a branch can introduce a 1-bit XOR gate, so the area and delay effects can be minimal. Similar to constant obfuscation, branch obfuscation can be applied only when relevant. For example, reset and update processes may not be obfuscated. The same procedure can be applied to ternary operators. When these operators can be RTL multiplexers, this procedure thwarts the data propagation between the inputs and the output. The multiplexer propagates the correct value with the correct key.

Exemplary Proof. For an m input RTL design, a control-flow graph ("CFG") G(C, E) having |C| nodes and |E| edges can be generated. A depth-first-traversal of the CFG can be performed, and order the r conditional nodes in the way they can be visited. Let the ordered set of conditional nodes be $C_{orig}=\{c_1, c_2, \ldots c_r\}$ (r=|C|). ASSURE branch obfuscation xor $C_{orig}$ with r-bit key $K^*_r$ as the logic locking procedure L and generate a locked design $G(C_{encrypted}=K)$. For example, if $C_{orig}=\{c_1, c_2, c_3, c_4\}$ and K=1101, then $C_{encrypted}=\{\overline{c_1},\overline{c_2},c_3,\overline{c_4}\}$. The locked design, post branch-obfuscation can be illustrated as follows.

$$G(C_{encrypted},E,K)=G(C_{orig}\oplus K^*_r,E) \quad (9)$$

where $G(C_{orig}, E)=G(C_{encrypted}, K)=K^*_r, E)=G(C_{encrypted}\oplus K^*_r, E)$.

Any unlocked CFG $G(C_{K_1}, E)$ and $G(C_{K_2}, E)$ using r-bit keys $K_1$ and $K_2$ on XOR based encrypted CFG $G(C_{encrypted}, K, E)$ can be unique.

Exemplary Proof. $\forall K_1 \neq K_2, K_1, K_2 \in \{0, 1\}^r$ $$\Rightarrow K_1 \oplus C_{encrypted} K_2 \oplus C_{encrypted} \Rightarrow C_{K_1} \neq C_{K_2}.$$

$$\Rightarrow G(C_{K_1},E) \neq G(C_{K_2},E).$$

CFG obfuscated design $G(C_{encrypted}, E, K)$ can be generated from $2^r$ possible combination of condition statuses with equal probability, i.e. the following condition holds true.

$$P[G(C_{encrypted},E,K)|G(C_{orig}\oplus K^*_r,E)]=P[G(C_{encrypted},E,K)|G(C_r \oplus K_r,E)]$$

$$\forall K_r \neq C_{orig} \neq C_r \quad (10)$$

Exemplary Proof. The probability of choosing $K_r$ can be uniform. So, $P[K=K^*_r]=P[K=K_r], \forall K_r \neq K^*_r, K_r \in 2^r$ $$\Rightarrow P[C_{encrypted} \oplus K^*_r]=P[C_{encrypted} \oplus K_r]$$

$$\Rightarrow P[C_{orig}]=P[C_r], C_{orig} \neq C_r,$$

$$C_r=\{p_1,p_2,\ldots,p_i,\ldots,p_r\}, \text{ where } p_i \in \{c_i,\overline{c_i}\}.$$

Combining the above exemplary embodiments can show that the encrypted CFGs can be indistinguishable for a family of $2^r$ possible designs.

Figure 6:
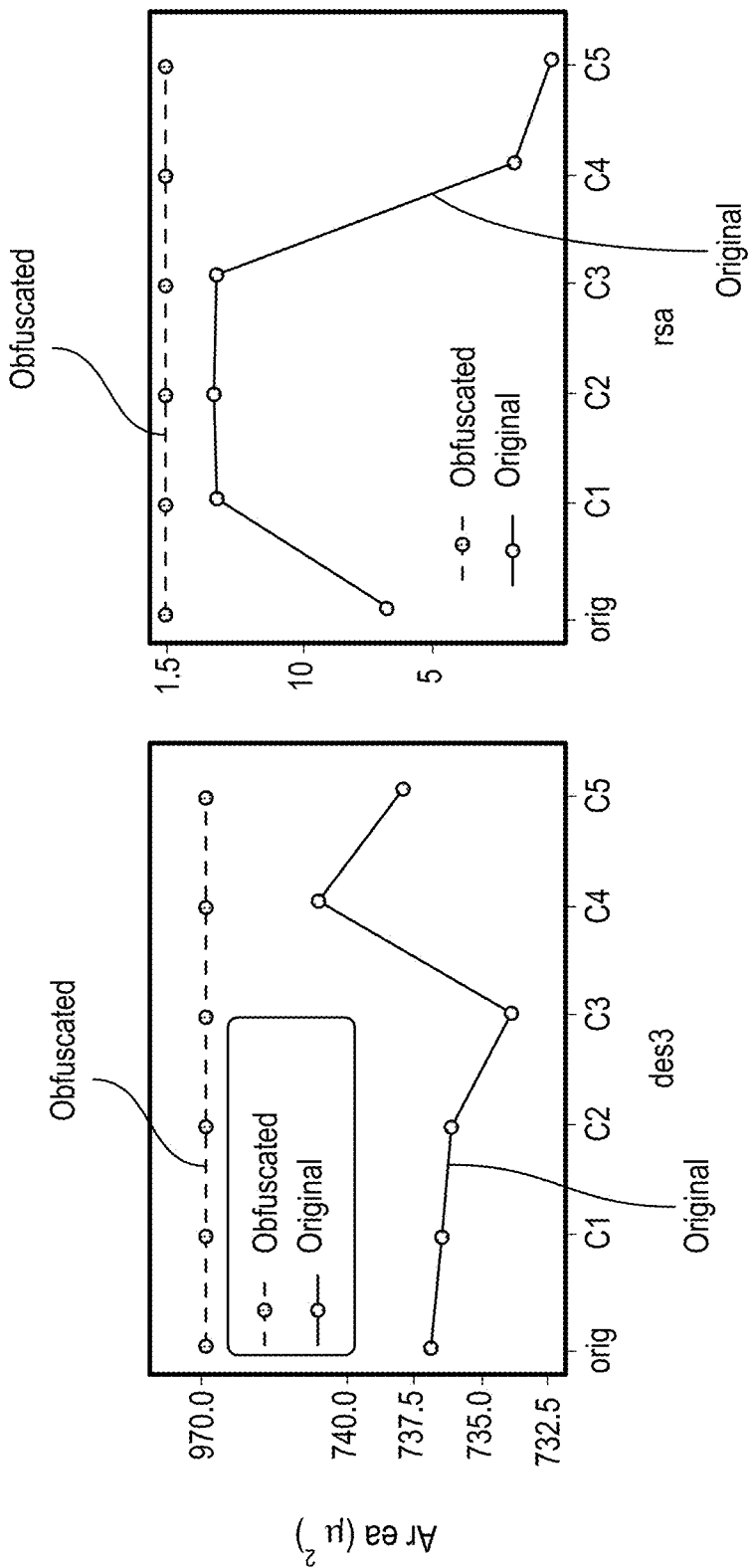
FIG. 6 is a set of graphs illustrating area overhead for original and obfuscated variants of benchmarks having different CFG flows according to an exemplary embodiment of the present disclosure.

FIG. 6 shows an exemplary area overhead of the two benchmark circuits DES3 and RSA in case of branch obfuscation showing empirical evidence of the exemplary claim that obfuscated circuits can be indistinguishable. Five conditions from each benchmark were identified, and five different variants were generated, flipping each condition at a time. After synthesizing the circuits, it was observed area overhead can be uniquely mapped to each variant of the design. The conditions in the CFG can be easily reverse engineered from the synthesized circuit and the flow of design can be unlocked. On the contrary, the area overhead of synthesized circuits remain the same after obfuscation, indicating the obfuscated circuits reveal no information about the control-flow of the circuit.

Exemplary ASSURE Against Oracle-Less Attacks

Provable security can ensure ASSURE's RTL obfuscation procedure via design indistinguishability is shown herein. For n-bit obfuscation procedure, there can be 2n possible RTL designs which can generate same obfuscated circuit. Using the proofs above for the ASSURE's obfuscation procedure, the resilience of ASSURE against state-of-art oracle-less attacks is shown.

Exemplary Resilience against desynthesis and redundancy attacks: It has been shown that greedy heuristics can recover the key of an obfuscated circuit post logic synthesis. (See, e.g., Reference 26). An incorrect key assignment results in large redundancy in the circuit triggering additional optimizations when re-synthesized. Similarly, an oracle-less attack using concepts from VLSI testing has been considered. (See, e.g., Reference 27). Incorrect key results in large logic redundancy and most of stuck-at faults become untestable. A correctly unlocked circuit however has high testability. ASSURE can obfuscate the design at the RTL followed by synthesis. Since, the obfuscated RTL can be equally likely to be generated from $2^n$ possible designs (e.g., for n-bit obfuscation), logic synthesis using different keys on a reverse-engineered obfuscated netlist may reveal no information about the original netlist. Hence, the area overhead for the correct and incorrect keys can be in same range. (See e.g., FIGS. 4, 5 and 6).

Exemplary Resilience against ML-guided attacks: oracle-less attacks on logic obfuscation have been considered by exploiting the fact that obfuscation procedures hide the functional by inserting XOR/XNOR gates and the process leaves traces of the structural signature. (See, e.g., References 28 and 29). The key gates can be assumed inserted into the design before synthesis, and the technology library and synthesis procedure/tool can be known. Since the effect of logic optimizations remains local and optimization rules can be deterministic, ML models can reconstruct the pre-synthesis design from an obfuscated circuit. One can recover the original function by launching an ML-guided removal attack on obfuscated RTL. In ASSURE, the obfuscation logic does not depend solely on insertion of XOR/XNORs. For example, in branch obfuscation, logic inversion can be performed instead of simple XOR followed by NOT when keybit=1. Recovering the original RTL from obfuscated RTL may be challenging.

TABLE 1

Characteristics of the input RTL benchmarks.

| Suite | Design | Modules | Const | Ops | Branches | Tot Bits | Comb cells |
|---|---|---|---|---|---|---|---|
| CEP | AES | 657 | 102,403 | 429 | 1 | 819,726 | 127667 |
|  | DES3 | 11 | 4 |  | 775 | 898 | 2076 |
|  | DFT | 211 | 447 | 151 | 132 | 8,697 | 118201 |
|  | FIR | 5 | 10 | 24 | 0 | 344 | 820 |
| CEP | IDFT | 211 | 447 | 151 | 132 | 8,697 | 118154 |
|  | IIR | 5 | 19 | 43 | 0 | 651 | 1378 |
|  | MD5 | 2 | 150 | 50 | 1 | 4,533 | 4682 |
|  | RSA | 15 | 243 | 35 | 13 | 1,942 | 222026 |
|  | SHA256 | 3 | 159 | 36 | 2 | 4,992 | 5574 |
| IWLS | MEM-CTRL | 27 | 492 | 442 | 160 | 2,096 | 4007 |
|  | SASC | 3 | 35 | 27 | 17 | 126 | 367 |
|  | SIMPLE_SPI | 3 | 55 | 34 | 15 | 288 | 476 |
|  | SS_PCM | 1 | 5 | 10 | 3 | 24 | 231 |
|  | USB_PHY | 3 | 67 | 70 | 34 | 223 | 287 |
| OpenCores | ETHMAC | 66 | 487 | 1,217 | 218 | 3,849 | 34783 |
|  | I2C_SLAVE | 4 | 104 | 14 | 11 | 269 | 466 |
|  | VGA_LCD | 16 | 123 | 310 | 56 | 885 | 54614 |
|  | ARIANE_ID | 4 | 3,498 | 385 | 723 | 4,606 | 1993 |
| OpenROAD | GCD | 11 | 15 | 4 | 12 | 496 | 168 |
|  | IBEX | 15 | 14,740 | 5,815 | 6,330 | 26,885 | 12161 |

| Suite | Seq cells | Buf cells | Inv cells | # nets | Area ($\mu m^2$) | Delay (ns) |
|---|---|---|---|---|---|---|
| CEP | 8502 | 506 | 21812 | 136493 | 42854.69 | 136.75 |
|  | 135 | 128 | 368 | 2448 | 736.96 | 192.28 |
|  | 38521 | 9552 | 41320 | 158807 | 81865.94 | 336.72 |
|  | 439 | 49 | 225 | 1704 | 1129.36 | 377.76 |
| CEP | 38525 | 9576 | 41305 | 158722 | 81821.90 | 333.59 |
|  | 648 | 72 | 367 | 2621 | 1679.72 | 464.82 |
|  | 269 | 168 | 923 | 5756 | 1840.15 | 791.53 |
|  | 57987 | 21808 | 66088 | 280222 | 134907.05 | 386.55 |
|  | 1040 | 243 | 1024 | 7532 | 3201.07 | 44.67 |
| IWLS | 1051 | 120 | 1136 | 5183 | 2373.35 | 260.72 |
|  | 116 | 0 | 125 | 500 | 238.24 | 84.4 |
|  | 130 | 2 | 145 | 623 | 282.57 | 119.42 |
|  | 87 |  | 94 | 338 | 168.29 | 90.51 |
|  | 98 | 0 | 85 | 401 | 194.15 | 71.91 |
| OpenCores | 10545 | 2195 | 12021 | 45441 | 22453.76 | 190.44 |
|  | 125 | 0 | 126 | 596 | 160.28 | 125.44 |
|  | 17052 | 4921 | 19228 | 71766 | 36095.90 | 224.67 |
|  | 378 | 96 | 559 | 2615 | 980.97 | 225.48 |
| OpenROAD | 34 |  | 32 | 253 | 100.91 | 161.87 |
|  | 1864 | 978 | 2965 | 14379 | 5758.84 | 538.1 |

I. Experimental Validation of ASSURE

Exemplary Experimental Setup

ASSURE was implemented as a Verilog tool that leverages Pyverilog (see, e.g., Reference 32), a Python-based hardware design processing toolkit to manipulate RTL Verilog. Pyverilog parses the input Verilog descriptions and creates the design AST. ASSURE then manipulates the AST. Pyverilog can then be used to read the output Verilog description ready for logic synthesis.

ASSURE has been used to protect several Verilog designs from different sources: the MIT-LL Common Evaluation Platform ("CEP") platform (see, e.g., Reference 30), the OpenROAD project (see, e.g., Reference 33), and the OpenCores repository. (See, e.g., Reference 34). Four CEP benchmarks (e.g., DCT, IDCT, FIR, IIR) can be created with Spiral, a hardware generator. (See, e.g., Reference 35). Table I shows the characteristics of these benchmarks in terms of number of hardware modules, constants, operations, and branches. This data also characterizes the functionality that needs obfuscation. The benchmarks can be much larger than those used by the gate-level logic locking experiments by the community. (See, e.g., Reference 9). Different from other techniques (see, e.g., Reference 16), ASSURE does not require any modifications to tools and applies to pre-existing industrial designs without access to an HLS tool. ASSURE processes the Verilog RTL descriptions with no modifications.

The ASSURE was analyzed in terms of security and overhead. For each benchmark, obfuscated variants were created using all procedures ("ALL") or one of constant ("CONST"), operation ("OP"), and branch ("BRANCH") obfuscations. The experiments were repeated by constraining the number of key bits available: 25%, 50%, 75% or 100% and reported in Table I. The exemplary resulting design can then be identified by a combination of its name, the configuration, and the number of key bits. For example, DFT-ALL-25 indicates obfuscation of the DFT benchmark, where all three obfuscations can be applied using 2,175 bits for obfuscation (e.g., 25% of 8,697) as follows: 38 for operations (e.g., 25% of 151), 33 for branches (e.g., 25% of 132) and the rest (e.g., 2,104) for constants.

Exemplary Security Assessment

Since no activated IC can be available to the attacker, methods based on the application of random keys can be used to analyze the security of the exemplary procedures for thwarting reverse engineering of the IC functionality. (See, e.g., Reference 10). The experimental analysis can be based on formal verification of the locked design against the unprotected design. The goal can be, e.g., twofold. First, it can be shown that when, e.g., the correct key $K^*_r$ can be used, the unlocked circuit matches the original. This experiment was labelled as CORRECTNESS. Second, it can be shown that flipping each single key bit can induce at least a failing point (i.e., no collision). This experiment demonstrates that each key bit can have an effect on the functionality of the circuit. This experiment was labelled as KEY EFFECT. It can be shown that there may be no other key that can activate the same IC. In this experiment, how the obfuscation procedures affect the IC functionality when the attacker provides incorrect keys can be quantified. The verification failure metric can be defined as follows:

$$F = \frac{1}{K} \cdot \Sigma_{i=1}^{K} \frac{n(FailingPoints)_i}{n(TotalPoints)} \quad (11)$$

This exemplary metric can be the average fraction of verification points that do not match when testing with different wrong keys. W Synopsys Formality N-2017.09-SP3 was used.

Exemplary Correctness: ASSURE was applied several times, each time with a random key to obfuscate operations and branches. These designs were verified against the original ones. In all experiments, ASSURE generates circuits that match the original design with the correct key.

Figure 7:
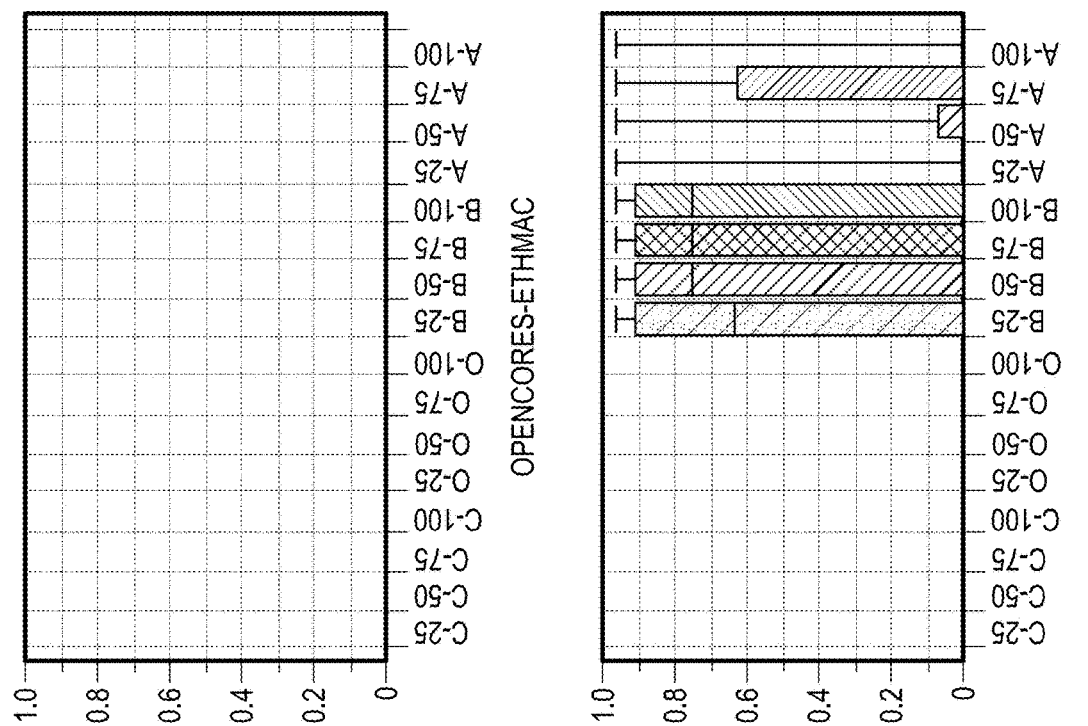
FIG. 7 is a set of exemplary graphs of verification failure metrics in KEY-EFFECT experiments according to an exemplary embodiment of the present disclosure.

Exemplary Key Effect: Given a design obfuscated with an r-bit key, r experiments were performed where in each of them with flipped one and only one key bit with respect to the correct key. In all cases, formal verification identifies at least one failing point, showing that an incorrect key always alters the circuit functionality. Also in this case, varying the locking key can have no effect since the failure can be induced by the flipped bit (e.g., from correct to incorrect) and not its value. FIG. 7 shows exemplary verification failure metrics for each experiment. Results may not be reported for FIR—BRANCH—* and IIR—BRANCH—* because they have no branches. AES, DFT, IDFT, and OPENCORES-ETHMAC benchmarks have low values (e.g., approximately $10^{-5}$) because these benchmarks have many verification points and only a small part can be failing. Operations and constants vitally impact the design as obfuscating them induces more failing points. Increasing the number of obfuscated operations reduces the metric. Since obfuscation can be performed using a depth-first analysis, the first bits correspond to operations closer to the inputs. As the analysis proceeds the obfuscation can be closer to the output and more internal points match. The metric can be an average across all cases. When all elements can be obfuscated, these effects can be averaged.

This experiment facilitated the identification of design practices that lead to inefficient obfuscations or even collisions. In DFT, one-bit signals were initialized with 32-bit integers with values 0/1. While Verilog facilitates this syntax, the signals can be trimmed by logic synthesis. A naive RTL constant analysis would pick 32 bits for obfuscating a single-bit. Since only the least significant bit impacts the circuit function, flipping the other 31 bits would lead to a collision. Thus, the ASSURE AST analysis can be extended to match the constant sizes with those of the target signals.

Exemplary Synthesis Overhead

Logic synthesis was performed using the Synopsys Design Compiler J-2018.04-5P5 targeting the Nangate 15 nm ASIC technology at standard operating conditions (e.g., 25C). The area overhead and critical-path delay degradation were evaluated relative to the original design. While the exemplary goal can be to protect the IP functionality and not to optimize the resources, designs with lower cost can be preferred. ASSURE generates correct designs with no combinational loops. Constant obfuscation extracts the values that can be used as the key and no extra logic. Operation obfuscation multiplexes results of original and dummy operations. Branch obfuscation adds XOR to the conditions.

Figure 9:
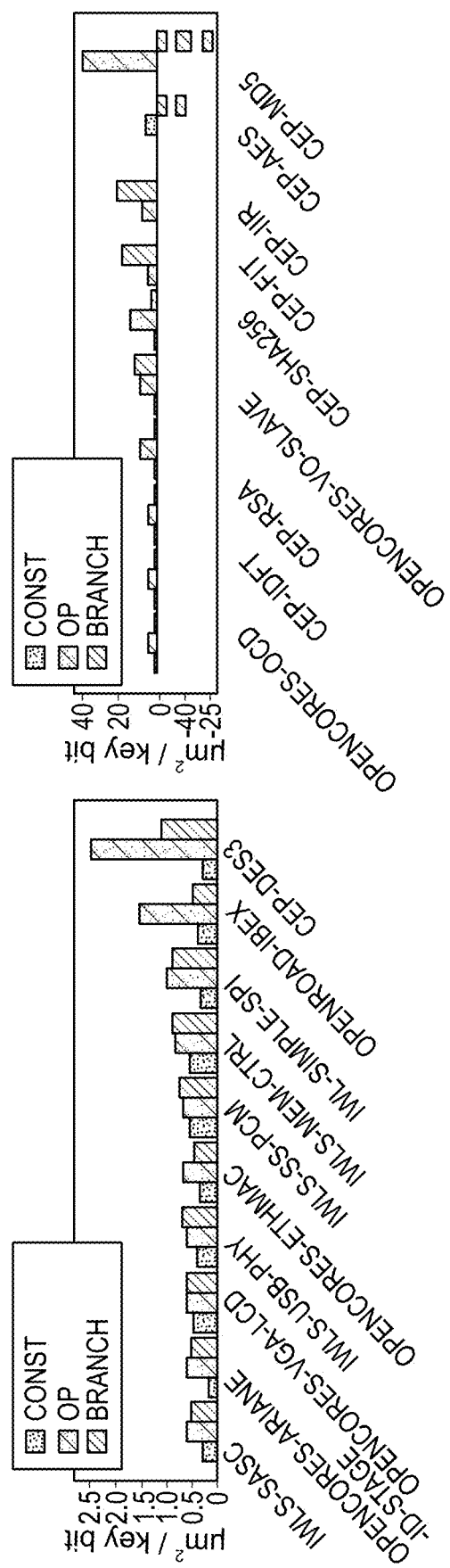
FIG. 9 is a set of exemplary graphs illustrating area overhead per key bit for ASSURE obfuscation according to an exemplary embodiment of the present disclosure.

Exemplary Area overhead: Table I reports the results of the original design—the number of cells in the netlists, the area (e.g., in $\mu m^2$) and the critical-path delay (e.g., in ns). FIG. 9 shows exemplary area overhead of all obfuscations with respect to the original designs accordingly to exemplary embodiments. The three procedures can be independent and so, ALL results can be the aggregate of the three procedures. Constant obfuscation produces an average overhead in the range 18% (*-CONST-25) to 80% (*-CONST-100). The maximum overhead can be about 450% for AES-CONST-100, which can have the most number of obfuscated constants. ASSURE removes hard-coded constants from the circuit, preventing logic optimizations like constant propagation. The average operation obfuscation overhead can be in the range 9% (*-OP-25) to 25% (*-OP-100). IBEX-OP-100 can have the maximum overhead of 155% since it can have the most operations. Branch obfuscation produces a smaller average overhead, in the range 6% (*-BRANCH-25) to 14% (*-BRANCH-100) with a maximum overhead of 113% for DES-BRANCH-100. This benchmark can have the largest proportion of branches relative to other elements. MD5 results in savings (e.g., approximately 4%) when applying branch obfuscation (MD5-BRANCH-*). The branch conditions help pick elements from the library that lower area overhead.

Figure 8:
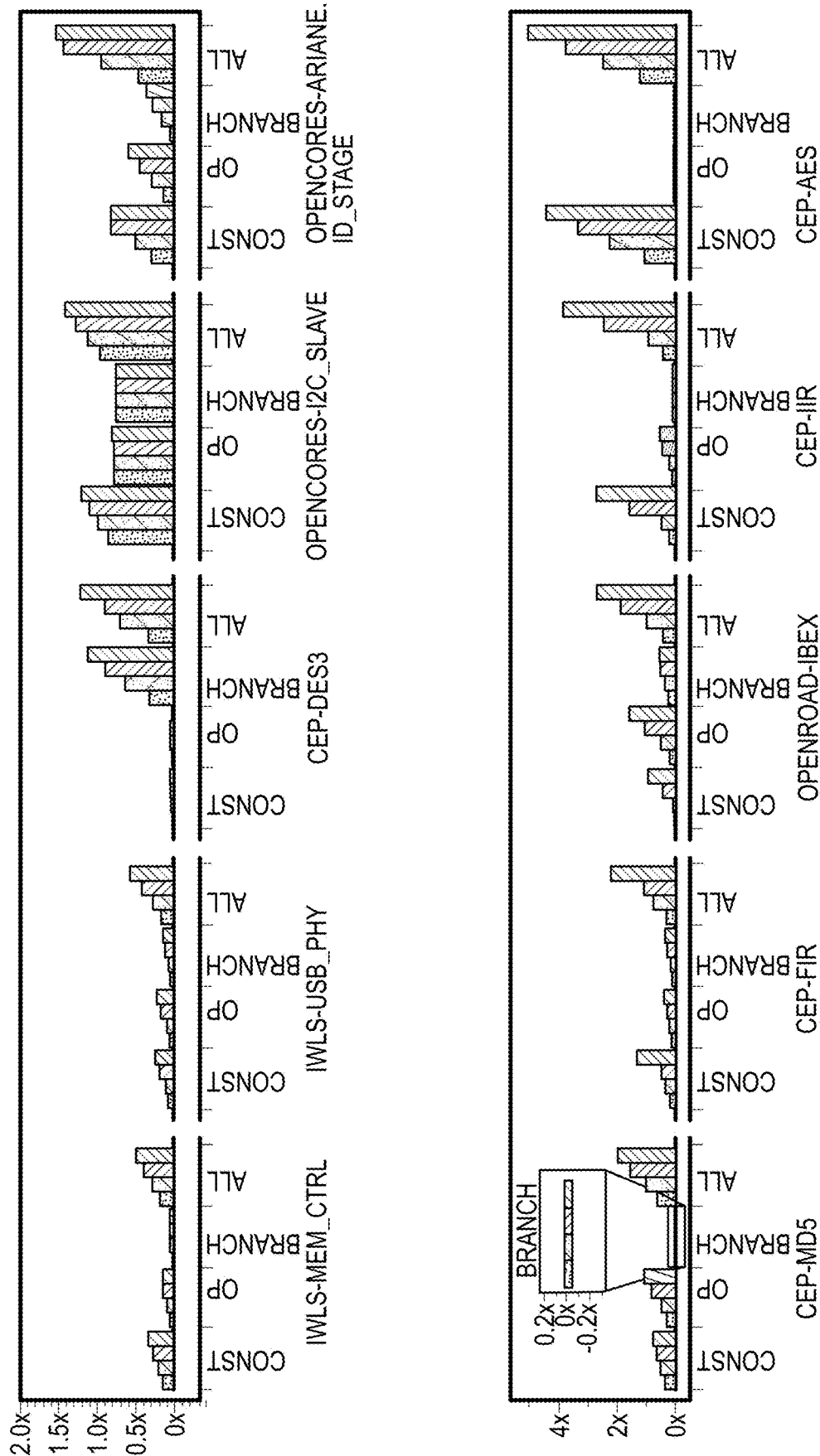
FIG. 8 is a set of exemplary graphs illustrating area overhead for ASSURE obfuscation according to an exemplary embodiment of the present disclosure.

An exemplary impact of ASSURE can depend on how many elements can be obfuscated in each configuration. Thus, the area overhead per key bit was computed as the area overhead of a configuration divided by the number of key bits used for its obfuscation and report it in FIG. 8. In most cases, operation obfuscation can have the largest impact, followed by branches and then constants. This impact can be larger for data-intensive benchmarks, like CEP filters (e.g., DFT, IDFT, FIR, and IIR). Constants usually require more obfuscation bits, so the impact per bit can be smaller. Each obfuscated operation introduces a new functional unit and multiplexer per key bit. MD5 can have a large negative impact when obfuscating the branches justifying the area reduction when applying only branch obfuscation (e.g., MD5–BRANCH–*). On the contrary, even if AES was the benchmark with the largest overhead (e.g., and many more bits), its overhead per key bit can be comparable with the others. The experiments were repeated several times and minimal variants were observed with different locking keys.

In exemplary embodiments, the area overhead can be related to the design characteristics and to the number of key bits. The former determine the impact of ASSURE, while the latter determine the total amount of overhead. The overhead depends on the design, the procedures, and the number of key bits and not on the values of the locking key.

Figure 10:
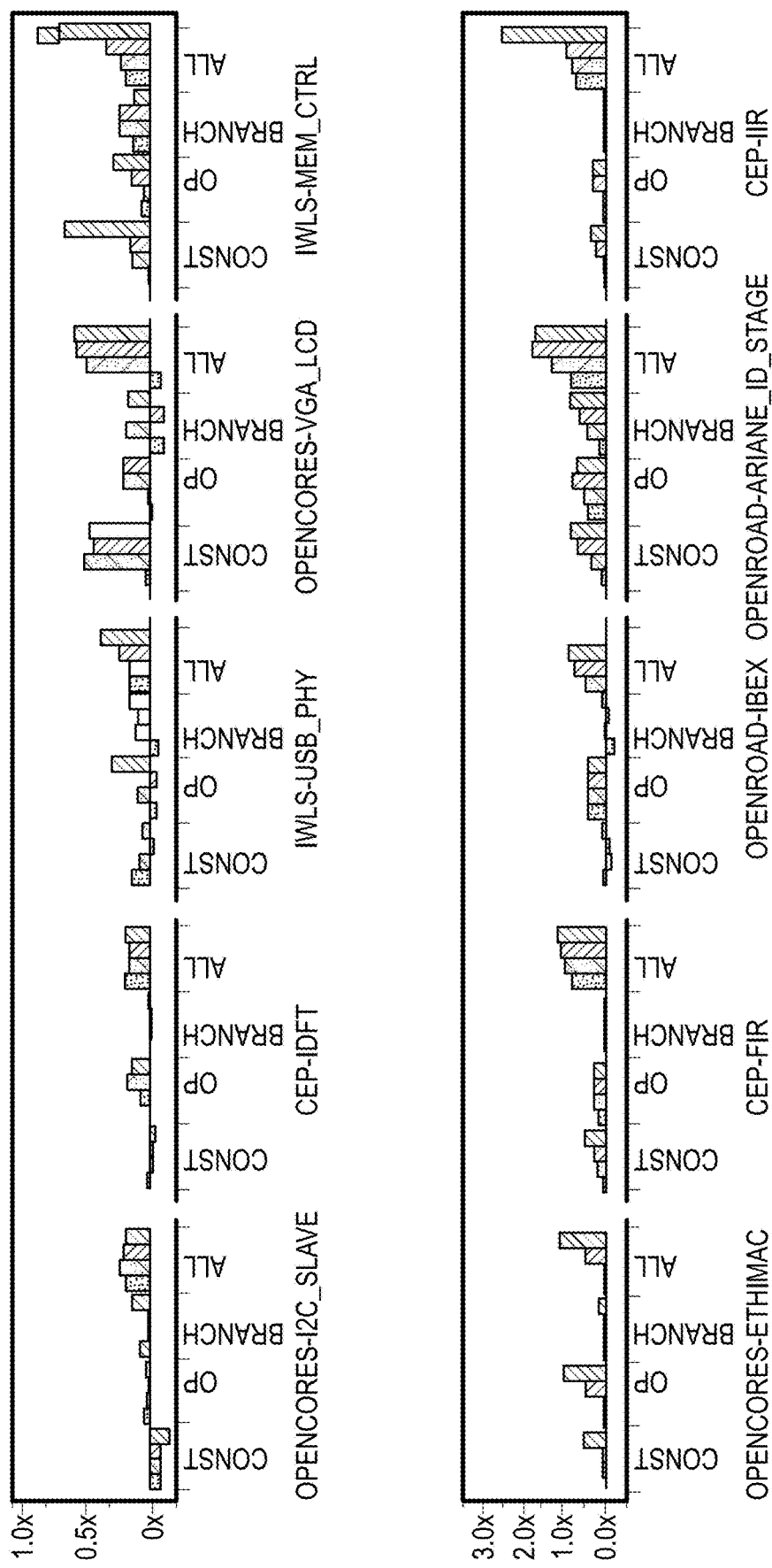
FIG. 10 is a set of exemplary graphs illustrating timing overhead for ASSURE obfuscation according to an exemplary embodiment of the present disclosure.

Exemplary Timing overhead: FIG. 10 shows an exemplary overhead introduced by the ASSURE obfuscation logic on the critical path when synthesis can be performed targeting area optimization according to exemplary embodiment of the present disclosure. Timing overhead can be application dependent with similar results across the different procedures. The overhead can be larger when the obfuscated elements can be on the critical path. This can be relevant in data-intensive (e.g., with many operations) and control-intensive (e.g., with control branches on critical path) designs. In most benchmarks, the timing overhead can be <20%. Constants have a positive impact on the overhead (e.g., see AES and DES3).

Figure 11:
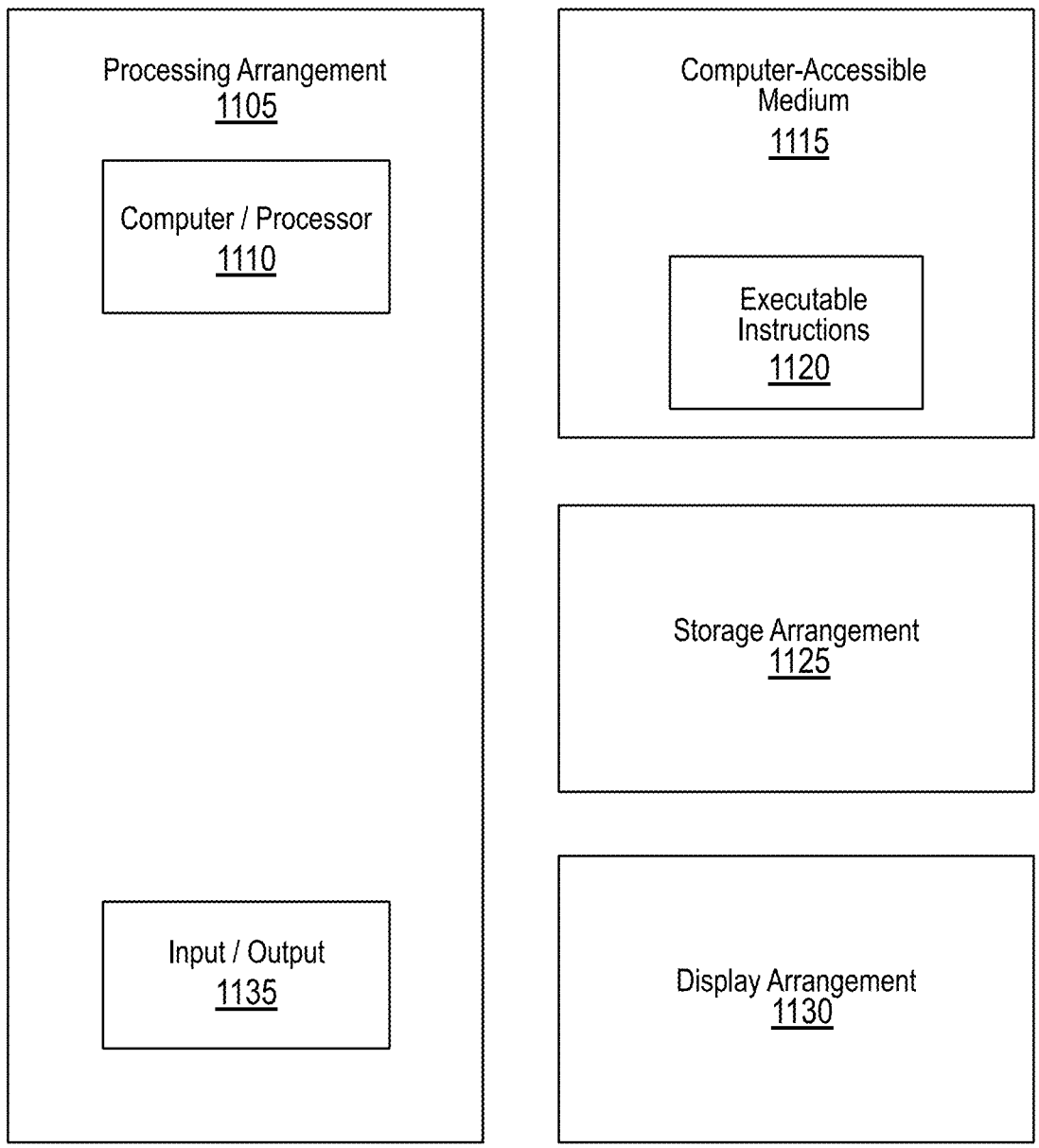
FIG. 11 is an illustration of an exemplary block diagram of an exemplary system in accordance with certain exemplary embodiments of the present disclosure.

FIG. 11 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1105. Such processing/computing arrangement 1105 can be, for example entirely or a part of, or include, but not limited to, a computer/processor 1110 that can include, for example one or more microprocessors, and use instructions stored on a computer-accessible medium (e.g., RAM, ROM, hard drive, or other storage device).

As shown in FIG. 11, for example a computer-accessible medium 1115 (e.g., as described herein above, a storage device such as a hard disk, floppy disk, memory stick, CD-ROM, RAM, ROM, etc., or a collection thereof) can be provided (e.g., in communication with the processing arrangement 1105). The computer-accessible medium 1115 can contain executable instructions 1120 thereon. In addition or alternatively, a storage arrangement 1125 can be provided separately from the computer-accessible medium 1115, which can provide the instructions to the processing arrangement 1105 so as to configure the processing arrangement to execute certain exemplary procedures, processes, and methods, as described herein above, for example.

Further, the exemplary processing arrangement 1105 can be provided with or include an input/output ports 1135, which can include, for example a wired network, a wireless network, the internet, an intranet, a data collection probe, a sensor, etc. As shown in FIG. 11, the exemplary processing arrangement 1105 can be in communication with an exemplary display arrangement 1130, which, according to certain exemplary embodiments of the present disclosure, can be a touch-screen configured for inputting information to the processing arrangement in addition to outputting information from the processing arrangement, for example. Further, the exemplary display arrangement 1130 and/or a storage arrangement 1125 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference, in their entireties:

[1] S. W. Jones, "Technology and Cost Trends at Advanced Nodes," IC Knowledge LLC, 2019.
[2] J. Hurtarte, E. Wolsheimer, and L. Tafoya, *Understanding Fabless IC Technology*. Elsevier, August 2007.
[3] S. Heck, S. Kaza, and D. Pinner, "Creating value in the semiconductor industry," *McKinsey on Semiconductors*, pp. 5-144, October 2011.
[4] U. Guin, K. Huang, D. DiMase, J. M. Carulli, M. Tehranipoor, and Y. Makris, "Counterfeit Integrated Circuits: A rising threat in the global semiconductor supply chain," *Proceedings of the IEEE*, vol. 102, no. 8, pp. 1207-1228, August 2014.
[5] W. Chen, S. Ray, J. Bhadra, M. Abadir, and L. Wang, "Challenges and trends in modern SoC design verification," *IEEE Design & Test*, vol. 34, no. 5, pp. 7-22, October 2017.
[6] J. Rajendran, O. Sinanoglu, and R. Karri, "Is split manufacturing secure?" in *Design, Automation & Test Conference in Europe*, 2013, pp. 1259-1264.
[7] A. T. Abdel-Hamid, S. Tahar, and E. M. Aboulhamid, "IP watermarking techniques: Survey and comparison," in *IEEE International Workshop on System-on-Chip for Real-Time Applications*, 2003, pp. 60-65.
[8] K. Shamsi, M. Li, K. Plaks, S. Fazzari, D. Z. Pan, and Y. Jin, "IP protection and supply chain security through logic obfuscation: A systematic overview," *ACM Transactions on Design Automation of Electronic Systems*, vol. 24, no. 6, September 2019.
[9] B. Tan, R. Karri, N. Limaye, A. Sengupta, O. Sinanoglu, M. M. Rahman, S. Bhunia, D. Duvalsaint, R. Blanton, A. Rezaei, Y. Shen, H. Zhou, L. Li, A. Orailoglu, Z. Han, A. Benedetti, L. Brignone, M. Yasin, J. Rajendran, M. Zuzak, A. Srivastava, U. Guin, C. Karfa, K. Basu, V. V. Menon, M. French, P. Song, F. Stellari, G.-J. Nam, P. Gadfort, A. Althoff, J. Tostenrude, S. Fazzari, E. Breckenfeld, and K. Plaks, "Benchmarking at the frontier of hardware security: Lessons from logic locking," *arXiv*, 2020.

[10] S. Amir, B. Shakya, X. Xu, Y. Jin, S. Bhunia, M. Tehranipoor, and D. Forte, "Development and evaluation of hardware obfuscation benchmarks," *Journal of Hardware and Systems Security*, vol. 2, pp. 142-161, 2018.

[11] Y. Shen, Y. Li, A. Rezaei, S. Kong, D. Dlott, and H. Zhou, "BeSAT: Behavioral SAT-based Attack on Cyclic Logic Encryption," in *Asia and South Pacific Design Automation Conference*, 2019, pp. 657-662.

[12] Y. Xie and A. Srivastava, "Anti-SAT: Mitigating SAT attack on logic locking," *IEEE Transactions on Computer-Aided Design of Integrated Circuits and Systems*, vol. 38, no. 2, pp. 199-207, February 2019.

[13] M. Yasin, A. Sengupta, M. T. Nabeel, M. Astraf, J. J. Rajendran, and O. Sinanoglu, "Provably-secure logic locking: From theory to practice," in *Conference on Computer and Communications Security*, 2017, pp. 1601-1618.

[14] F. Yang, M. Tang, and O. Sinanoglu, "Stripped Functionality Logic Locking with Hamming Distance Based Restore Unit (SFLL-hd)—unlocked," *IEEE Transactions on Information Forensics and Security*, pp. 1-9, 2019.

[15] D. Sirone and P. Subramanyan, "Functional analysis attacks on logic locking," in *Design, Automation & Test Conference in Europe*, March 2019, pp. 1-6.

[16] C. Pilato, F. Regazzoni, R. Karri, and S. Garg, "TAO: Techniques for algorithm-level obfuscation during high-level synthesis," in *Design Automation Conference*, June 2018, pp. 1-6.

[17] M. Yasin, C. Zhao, and J. J. Rajendran, "SFLL-HLS: Stripped-functionality logic locking meets high-level synthesis," in *International Conference on Computer-Aided Design*, 2019, pp. 1-4.

[18] Y. Lao and K. K. Parhi, "Obfuscating dsp circuits via high-level transformations," *IEEE Transactions on Very Large Scale Integration (VLSI) Systems*, vol. 23, no. 5, pp. 819-830, 2015.

[19] G. Di Crescenzo, A. Sengupta, O. Sinanoglu, and M. Yasin, "Logic locking of boolean circuits: Provable hardware-based obfuscation from a tamper-proof memory," in *Innovative Security Solutions for Information Technology and Communications*, E. Simion and R. Géraud-Stewart, Eds. Cham: Springer International Publishing, 2020, pp. 172-192.

[20] C. Collberg, C. Thomborson, and D. Low, "A taxonomy of obfuscating transformations," Department of Computer Science, The University of Auckland, New Zealand, Tech. Rep. 148, 1997.

[21] C. K. Behera and D. L. Bhaskari, "Different obfuscation techniques for code protection," in *International Conference on Eco-friendly Computing and Communication Systems*, vol. 70, 2015, pp. 757-763.

[22] H. Xu, Y. Zhou, Y. Kang, and M. R. Lyu, "On secure and usable program obfuscation: A survey," *ArXiv*, 2017.

[23] K. Shamsi, D. Z. Pan, and Y. Jin, "On the impossibility of approximation-resilient circuit locking," in *IEEE International Symposium on Hardware Oriented Security and Trust*, 2019, pp. 161-170.

[24] D. S. B. T. Force, "Report on high performance microchip supply," https://www.hsdl.org/?abstract&did=454591, 2005.

[25] J. Rajendran, A. Ali, O. Sinanoglu, and R. Karri, "Belling the cad: Toward security-centric electronic system design," *IEEE Transactions on Computer-Aided Design of Integrated Circuits and Systems*, vol. 34, no. 11, pp. 1756-1769, November 2015.

[26] M. E. Massad, J. Zhang, S. Garg, and M. V. Tripunitara, "Logic locking for secure outsourced chip fabrication: A new attack and provably secure defense mechanism," *arXiv*, 2017.

[27] L. Li and A. Orailoglu, "Piercing logic locking keys through redundancy identification," in *Design, Automation & Test Conference in Europe*, 2019, pp. 540-545.

[28] P. Chakraborty, J. Cruz, and S. Bhunia, "SAIL: Machine learning guided structural analysis attack on hardware obfuscation," in *Asian Hardware Oriented Security and Trust Symposium*, 2018, pp. 56-61.

[29] ------, "SURF: Joint structural functional attack on logic locking," in *International Symposium on Hardware Oriented Security and Trust*, 2019, pp. 181-190.

[30] MIT Lincoln Laboratory, "Common Evaluation Platform (CEP)," Available at: https://github.com/mit-11/CEP.

[31] H. Badier, J. L. Lann, P. Coussy, and G. Gogniat, "Transient key-based obfuscation for hls in an untrusted cloud environment," in *Design, Automation & Test Conference in Europe*, 2019, pp. 1118-1123.

[32] S. Takamaeda-Yamazaki, "Pyverilog: A Python-based hardware design processing toolkit for Verilog HDL," in *International Symposium on Applied Reconfigurable Computing*, April 2015, pp. 451-460.

[33] T. Ajayi, V. A. Chhabria, M. Fogaca, S. Hashemi, A. Hosny, A. B. Kahng, M. Kim, J. Lee, U. Mallappa, M. Neseem, F. Pradipta, S. Reda, M. Saligane, S. S. Sapatnekar, C. Sechen, M. Shalan, W. Swartz, L. Wang, Z. Wang, M. Woo, and B. Xu, "Toward an open-source digital flow: First learnings from the openroad project," in *Design Automation Conference*, 2019.

[34] Oliscience, "OpenCores repository," Available at: https://opencores.org/.

[35] M. Püschel, F. Franchetti, and Y. Voronenko, *Encyclopedia of Parallel Computing*. Springer, 2011, ch. Spiral.

What is claimed is:

1. A method for protecting at least one integrated circuit (IC) design, comprising:
receiving a first register-transfer level (RTL) design comprising an input hardware description language (HDL);
generating, by parsing the input HDL, an abstract syntax tree associated with the IC design;
selecting semantic elements in the abstract syntax tree to lock the first RTL design;
locking the semantic elements selected from the generated abstract syntax tree,
wherein the locking of the selected semantic elements includes generating an opaque predicate which is performed in hardware;
obfuscating the locked semantic elements with an input key; and
generating a second RTL design based on the obfuscated locked sematic elements;
wherein a functionality of the first RTL design matches a functionality of the second RTL design when a predetermined locking key is applied to the second RTL design.

2. The method of claim 1, wherein the semantic elements are at least one of constants, operations or branches.

3. The method of claim 1, wherein the selecting of the semantic elements includes uniquifying a module hierarchy and generating a list of modules.

4. The method of claim 1, wherein the selecting of the semantic elements is based on a black list of modules to be excluded from the locking procedure.

5. The method of claim 4, wherein the black list includes update processes and loop induction variables.

6. The method of claim 1, wherein selecting the semantic elements is based on a number of bits required to lock the semantic elements, and wherein the semantic elements are locked at a register transfer level.

7. The method of claim 1, wherein the opaque predicate is a predicate having a known outcome.

8. A system for providing for protecting at least one integrated circuit (IC) design, comprising:
a computer hardware arrangement configured to:
receive a first register-transfer level (RTL) design comprising an input hardware description language (HDL);
generate, by parsing the input HDL, an abstract syntax tree associated with the IC design;
select semantic elements in the abstract syntax tree to lock the first RTL design;
lock the selected semantic elements selected from the generated abstract syntax tree,
wherein the locking of the selected semantic elements includes generating an opaque predicate which is performed in hardware;
obfuscate the locked semantic elements with an input key; and
generate a second RTL design based on the obfuscated locked sematic elements;
wherein a functionality of the first RTL design matches a functionality of the second RTL design when a predetermined locking key is applied to the second RTL design.

9. The system of claim 8, wherein the semantic elements are at least one of constants, operations or branches.

10. The system of claim 8, wherein the computer hardware arrangement is configured to select the semantic elements by uniquifying a module hierarchy and generating a list of modules.

11. The system of claim 8, wherein the computer hardware arrangement is configured to select the semantic elements based on a black list of modules to be excluded from the locking procedure.

12. The system of claim 11, wherein the black list includes update processes and loop induction variables.

13. The system of claim 8, wherein the computer hardware arrangement is configured to (i) select the semantic elements based on a number of bits required to lock the semantic elements, and (ii) lock the semantic elements at a register transfer level.

14. The system of claim 8, wherein the opaque predicate is a predicate having a known outcome.

15. A non-transitory computer-accessible medium having stored thereon computer-executable instructions for protecting at least one integrated circuit (IC) design, wherein, when a computing arrangement executes the instructions, the computing arrangement is configured to perform procedures comprising:
receiving a first register-transfer level (RTL) design comprising an input hardware description language (HDL);
generating, by parsing the input HDL, an abstract syntax tree associated with the IC design;
selecting semantic elements in the abstract syntax tree first data to lock the first RTL design;
locking the selected semantic elements selected from the generated abstract syntax tree, wherein the locking of the selected semantic elements includes generating an opaque predicate which is performed in hardware;
obfuscating the locked semantic elements with an input key; and
generating a second RTL design based on the obfuscated locked sematic elements;
wherein a functionality of the first RTL design matches a functionality of the second RTL design when a predetermined locking key is applied to the second RTL design.

16. The method of claim 1, wherein the predetermined key is loaded into at least one register which replaces at least one constraint of the second RTL design to protect the at least one IC design.

17. The system of claim 8, wherein the predetermined key is loaded into at least one register which replaces at least one constraint of the second RTL design to protect the at least one IC design.

18. The computer-accessible medium of claim 15, wherein the predetermined key is loaded into at least one register which replaces at least one constraint of the second RTL design to protect the at least one IC design.

19. The method of claim 1, wherein the locked semantic elements are obfuscated with the input key digitally.

20. The system of claim 8, wherein the locked semantic elements are obfuscated with the input key digitally.

21. The computer-accessible medium of claim 15, wherein the locked semantic elements are obfuscated with the input key digitally.

* * * * *